United States Patent
Kawanishi et al.

(10) Patent No.: US 9,117,275 B2
(45) Date of Patent: Aug. 25, 2015

(54) CONTENT PROCESSING DEVICE, INTEGRATED CIRCUIT, METHOD, AND PROGRAM

(71) Applicant: PANASONIC INTELLECTUAL PROPERTY CORPORATION OF AMERICA, Torrance, CA (US)

(72) Inventors: Ryouichi Kawanishi, Kyoto (JP); Keiji Icho, Osaka (JP); Kento Ogawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 209 days.

(21) Appl. No.: 13/824,796

(22) PCT Filed: Oct. 26, 2012

(86) PCT No.: PCT/JP2012/006891
§ 371 (c)(1),
(2) Date: Mar. 18, 2013

(87) PCT Pub. No.: WO2013/132557
PCT Pub. Date: Sep. 12, 2013

(65) Prior Publication Data
US 2014/0112585 A1    Apr. 24, 2014

(30) Foreign Application Priority Data
Mar. 5, 2012    (JP) .................................. 2012-047965

(51) Int. Cl.
G06K 9/68    (2006.01)
G06T 7/00    (2006.01)
G06T 11/60   (2006.01)

(52) U.S. Cl.
CPC ............... *G06T 7/0044* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 6,222,947 | B1 | 4/2001 | Koba |
| 8,806,332 | B2 * | 8/2014 | Cok .............................. 715/243 |
| 2002/0015514 | A1 | 2/2002 | Kinjo |
| 2002/0019833 | A1 | 2/2002 | Hanamoto |
| 2005/0008246 | A1 | 1/2005 | Kinjo |

(Continued)

FOREIGN PATENT DOCUMENTS

| | | |
|---|---|---|
| JP | 10-293856 | 11/1998 |
| JP | 2002-49907 | 2/2002 |

(Continued)

OTHER PUBLICATIONS

International Search Report issued Nov. 27, 2012 in International (PCT) Application No. PCT/JP2012/006891.

*Primary Examiner* — Daniel Mariam
(74) *Attorney, Agent, or Firm* — Wenderoth, Lind & Ponack, L.L.P.

(57) ABSTRACT

Attribute information is extracted from content stored by users. A product expression model indicating a product display method is corrected using reference information pertaining to content characteristics suitable for the product expression model and using attribute information. Processing information is then determined for making the content suit the corrected product expression model. The content is processed according to the determined processing information and a product is generated using the corrected product expression model.

19 Claims, 24 Drawing Sheets

(56) References Cited

U.S. PATENT DOCUMENTS

| | | | |
|---|---|---|---|
| 2005/0134933 A1 | 6/2005 | Tsue et al. | |
| 2006/0092487 A1 | 5/2006 | Kuwabara et al. | |
| 2006/0139371 A1* | 6/2006 | Lavine et al. | 345/620 |
| 2006/0251299 A1 | 11/2006 | Kinjo | |
| 2006/0279555 A1* | 12/2006 | Ono | 345/173 |
| 2007/0183679 A1 | 8/2007 | Moroto et al. | |
| 2009/0116752 A1* | 5/2009 | Isomura et al. | 382/217 |
| 2010/0118052 A1 | 5/2010 | Tsue et al. | |
| 2011/0304644 A1 | 12/2011 | Wada et al. | |
| 2012/0098994 A1* | 4/2012 | Cheatle et al. | 348/222.1 |
| 2012/0182312 A1 | 7/2012 | Hashida et al. | |

FOREIGN PATENT DOCUMENTS

| | | |
|---|---|---|
| JP | 2002-77592 | 3/2002 |
| JP | 2005-182767 | 7/2005 |
| JP | 2006-129389 | 5/2006 |
| JP | 2006-350521 | 12/2006 |
| JP | 2007-26387 | 2/2007 |
| JP | 2010-72934 | 4/2010 |
| JP | 2011-76340 | 4/2011 |
| JP | 2011-164277 | 8/2011 |
| JP | 2011-205296 | 10/2011 |
| JP | 2012-4747 | 1/2012 |
| JP | 2012-130044 | 7/2012 |
| WO | 2005/076210 | 8/2005 |

* cited by examiner

FIG. 3

| Content No. | File Name | Acquisition Time | Device Metadata ||||||| 
| | | | Latitude | Longitude | ISO | Exposure | Device | Mode | ... |
| ID000000001 | img001.jpg | 2010/05/05 13:05 | +43.0523 | +142.7266 | 100 | 1/40s | Camera A | Macro | ... |
| ID000000002 | img002.jpg | 2010/05/05 14:13 | +43.0524 | +142.7260 | 200 | 1/40s | Camera B | Portrait | ... |
| ID000000003 | mov001.mpg | 2010/05/05 15:18 | +43.0531 | +142.7255 | 100 | 1/640s | Movie B | Normal | ... |
| ID000000004 | mus001.avi | 2010/05/05 16:04 | - | - | - | - | - | HQ | ... |
| ... | ... | ... | ... | ... | ... | ... | ... | ... | ... |

FIG. 4

| Content No. | Analysis Metadata | | | | | | | | | | |
|---|---|---|---|---|---|---|---|---|---|---|---|
| | Colour | Edges | Local | Face | Orientation | Number | Situation | Object | Audio | Tuning | ... |
| ID00000001 | 85 | 11 | Vector 1 | Yes | R, R, R | 3 | Indoor | Cake | – | – | ... |
| ID00000002 | 45 | 30 | Vector 2 | No | – | 0 | Beach | Parasol | – | – | ... |
| ID00000003 | 21 | 100 | Vector 3 | Yes | Front, Front | 2 | Park | Slide | Laughter | – | ... |
| ID00000004 | – | – | – | – | – | – | – | – | Music | Pop | ... |
| ... | ... | ... | ... | ... | ... | ... | ... | ... | ... | ... | ... |

FIG. 5

| Content No. | Usage Metadata | | | | | |
|---|---|---|---|---|---|---|
| | Event Name | Persons Featured | Tag | Play Count | Product Usage | Shared |
| ID00000001 | Picnic | A, B, C | Okayama | 2 | Album 01 | SNS 01 |
| ID00000002 | Ski trip | A, D, E, F | Akakura | 1 | Slideshow 01 | Friend D |
| ID00000003 | Sporting event | A, B, C | X Elementary, Grade 4 class | 0 | Album 02 | SNS 02 |
| ID00000004 | Entrance ceremony | – | Team gymnastics | 1 | – | Grandparents |
| ... | ... | ... | ... | ... | ... | ... |

FIG. 6

| Expression Model No. | Product Expression Model | | | | | | |
|---|---|---|---|---|---|---|---|
| | Adjustable Item | Referent Value | Content Processing | Decoration | Transition | Layout | ... |
| mID00001 | Number of faces | 1 | Upper body extraction | Cartoon facing person | – | n-polygon | ... |
| mID00002 | Number of photobombers | 1 | – | Cartoon composite | – | – | ... |
| mID00003 | Background (sky to ground) ratio | 1 : 1 | Referent value extraction | – | Zoom in | – | ... |
| mID00004 | Selected image and background | – | Similar region extraction | – | – | Background search | ... |
| ... | ... | ... | ... | ... | ... | ... | ... |

FIG. 11

| Content No. | Template Information ||||||
|---|---|---|---|---|---|---|
| | Selected Layout 1 | Processing 1 | Selected Layout 2 | Processing 2 | Selected Layout 3 | Processing 3 |
| tID00000001 | template1-1 | mID000101 | template1-2 | mID000102 | template1-3 | mID000103 |
| tID00000002 | template2-1 | mID000201 | template2-2 | mID000202 | template2-3 | mID000203 |
| tID00000003 | template3-1 | mID000301 | template3-2 | mID000302 | template3-3 | mID000303 |
| tID00000004 | template4-1 | mID000401 | template4-2 | mID000402 | template4-3 | mID000403 |
| ⋮ | ⋮ | ⋮ | ⋮ | ⋮ | ⋮ | ⋮ |

FIG. 13

| Processing No. | Frame | Adjustable Item | Referent Value | Processing Information | | | |
|---|---|---|---|---|---|---|---|
| | | | | Content Processing | Decoration | Transition | Layout |
| mID000101 | 1 | Number of Faces | 1 | Body area extraction | Cartoon facing person | — | Straight line |
| | 2 | Sky Proportion | 0.5 | Area extraction | — | Zoom-in | — |
| | 3 | Background Similarity | 1 | Background image similarity | — | — | Similar image selection |
| | ⋮ | | | | ⋮ | ⋮ | ⋮ |

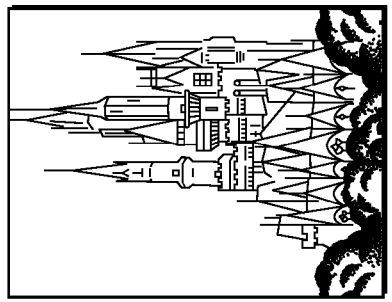
FIG. 15C  Selected image for frame 3
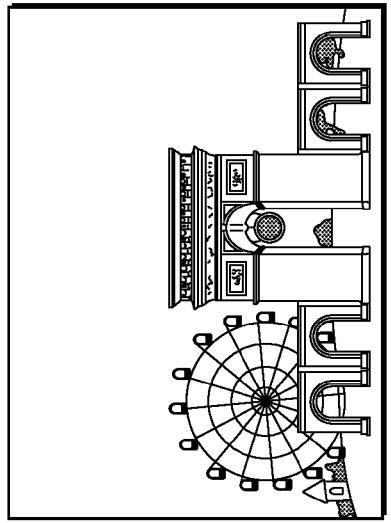
FIG. 15B  Selected image for frame 2
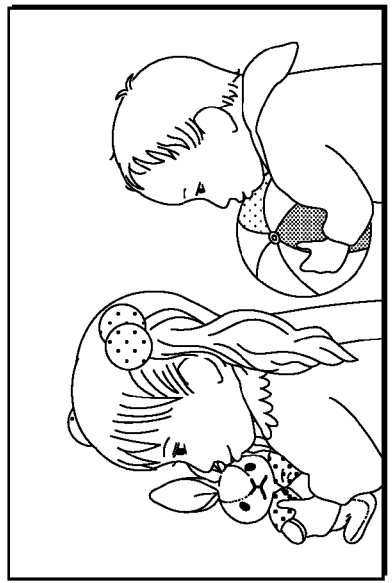
FIG. 15A  Selected image for frame 1

FIG. 17

| Processing No. | Frame | Adjustable Item | Referent Value | Attribute Value | Difference Value | Processing Information | Additional Processing Information | Correction Priority | Correction Execution |
|---|---|---|---|---|---|---|---|---|---|
| mID00101 | 1 | Number of Faces | 1 | 2 | +1 | Upper body extraction | Cartoon facing person (Upper body) | 3 | ✓ |
| | 2 | Sky Proportion | 0.5 | 0.4 | −0.1 | Area extraction | − | 3 | ✓ |
| | 3 | Background Similarity | 1 | 0.5 | −0.5 | − | Select similar image from database | 2 | ✓ |
| | | | | | | | Download similar image from server | 1 | × |

CONTENT PROCESSING DEVICE, INTEGRATED CIRCUIT, METHOD, AND PROGRAM

TECHNICAL FIELD

The present disclosure relates to digital content processing technology for generating a product with processing in accordance with content specifics.

BACKGROUND OF INVENTION

Background Art

In recent years, cameras photographing a photographic object have become widespread, such as Digital Still Cameras (hereinafter, DSC) including compact cameras, mirrorless system cameras, and single-lens reflex cameras, and further including mobile telephone devices equipped with cameras as well as digital movie cameras. This development has made photography of pictures and video easily possible. Also, large-capacity storage media for image data have progressed. In addition, developments in social media have led to numerous people sharing personal content. As such, individual users have been enabled to store and share extremely large amounts of digital content (hereinafter simply termed content). However, the extremely large group of content stored by a user requires the application of much time and effort in order to be enjoyed.

Thus, in order to enable the user to effectively enjoy desired content, attention is now coming to content processing technology for selecting a model, such as a template, that has been prepared in advance according to the content or a photographic event, and automatically processing the content as defined by the model.

A known method exists for decorating image content by using image analysis applied to the image to estimate the photographic object or photograph context, extracting a decoration from a decoration database using the results of such analysis, and applying the extracted decoration to the photographed image (e.g., Patent Literature 1).

Also, a known method exists for creating a digital album using a content group by designating a template describing photographic data features and a processing method, comparing the photographic data features in the content group to the photographic data features indicated for each frame of a layout, determining layout candidate images, and applying the processing described in the template to the determined images (e.g., Patent Literature 2).

CITATION LIST

Patent Literature

[Patent Literature 1]
Japanese Patent Application Publication No. 2011-205296
[Patent Literature 2]
Japanese Patent Application Publication No. 2010-72934

SUMMARY OF INVENTION

However, the technology of Patent Literature 1 requires that decorative images be available for any photographic object or photograph context estimated from the content. As such, a problem arises in that image decoration cannot be applied to content for which the photographic object or photograph content cannot be estimated.

Also, the technology of Patent Literature 2 requires that the features sought in processing target content be determined for each template, and that the image data features of the content must match the image data features written in the template for each layout frame. As such, when a template most suitable for the content is not available, a problem occurs in that a digital album cannot be created.

In view of the above problems, the present invention aims to provide content processing technology enabling a user to easily generate a product for viewing, using user-stored content without an appropriate model or database.

In order to solve the problem posed by the conventional technology, a digital content processing device generates a product by processing digital content using a product expression model that indicates how the product is to be expressed, the content processing device comprising: a content information acquirer acquiring attribute information from a piece of target content; a reference information acquirer acquiring reference information pertaining to a product expression model and indicating an attribute sought in a piece of content matching the product expression model; a processing information determiner correcting the product expression model according to the reference information and the attribute information, and determining processing information for processing the piece of target content to match the product expression model thus corrected; and a processing executor processing the piece of target content according to the processing information, and using the piece of target content thus processed and the product expression model thus corrected to generate the product.

According to the content processing device described above, a product expression model is corrected using the attribute information of the content, enabling use of a product expression model suitable for the content, and thus eliminating the need for the content processing device to store processing information suited to the content in advance. As such, the user is able to use the corrected product expression model to produce content into an effective viewing format, without having to start from scratch.

BRIEF DESCRIPTION OF DRAWINGS

FIG. 3 indicates an example of device metadata for content extracted from a content group.

FIG. 4 indicates an example of analysis metadata for content extracted from the content group.

FIG. 5 indicates an example of usage metadata for content extracted from the content group.

FIG. 6 shows an example of product expression models accumulated in a product expression model accumulator 3 pertaining to Embodiment 1.

FIG. 11 shows an example of template information for templates accumulated in a product expression model accumulator 3 pertaining to Embodiment 2.

FIG. 13 indicates an example of processing mID000101 for a template.

FIGS. 15A, 15B, and 15C illustrate images selected for frames 1 through 3 according to selection criteria of the template 1-1.

FIG. 17 indicates examples of content processing, template corrections, and correction priority pertaining to frames 1 through 3.

DETAILED DESCRIPTION OF INVENTION

Background Leading to Invention

In the field of content processing technology for creating an effectively enjoyable product from content, widely-known technologies include a method of applying a decorative image template or the like for focusing on a single particular characteristic of the content, as discussed in Patent Literature 1, and a method of searching for content having a characteristic defined as being paired with a template, as discussed in Patent Literature 2.

However, the technology discussed in Patent Literature 1 leads to the product being created by focusing on one particular characteristic, irrespective of whether any other characteristic, not focused upon and not reflected in the product, is important to the user. That is, the product is made dependent on a single focused-upon characteristic, which is problematic in that the content is not necessarily effectively enjoyed through such a product.

Conversely, the technology discussed in Patent Literature 2 requires that the content match the characteristics to be paired with the content. Applying a template that is not necessarily the most appropriate to the content creates discomfort when the layout or decorative image does not match the content. As such, the content cannot be effectively enjoyed as a product.

The aforementioned problems with conventional content processing technology occur because the creative intent behind content and the intent of a template used in processing are not necessarily alike. Thus, the most appropriate template is not always used on the content. However, preparing a set of templates optimally appropriate for use with a wide variety of content is extremely challenging.

That said, the inventors have thought up an approach to product generation by correcting a template using characteristics of the content to be paired with the template and characteristics of the actual content, then using the corrected template. This enables creation of a corrected template that is most suitable for the content, despite a most appropriate template not being originally available for the content. Accordingly, a product is generated that reflects the creative intent of the template as well as the creative intent of the content.

[Embodiments of the Disclosure]

Embodiments of the disclosure are described below, with reference to the accompanying drawings.

[Embodiment 1]

(Configuration)

Figure 1:
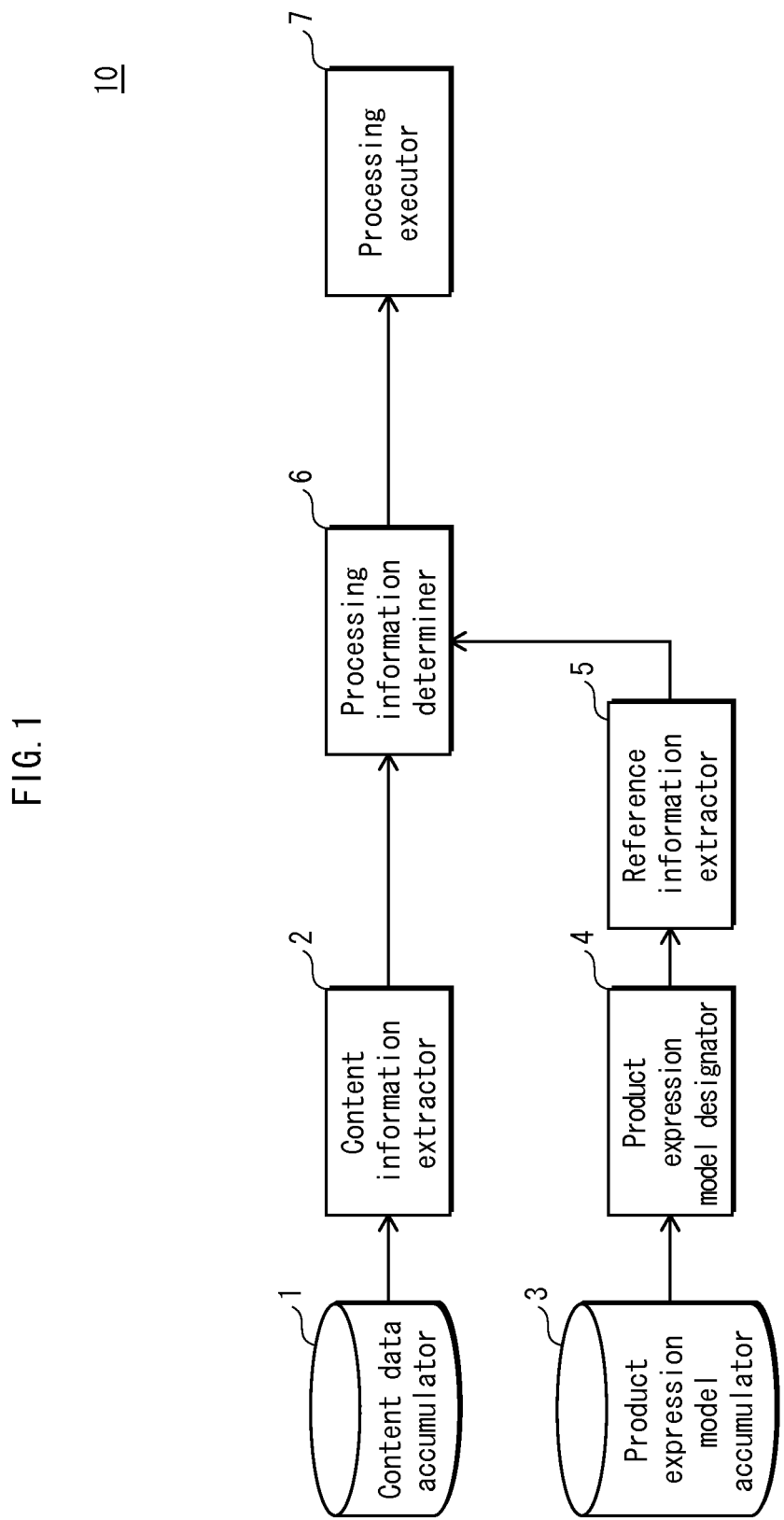
FIG. 1 is a block diagram of a content processing device pertaining to Embodiments 1 and 2.

FIG. 1 is a block diagram indicating the configuration of a content processing device 10 pertaining to the present Embodiment. As shown, the content processing device 10 includes a content data accumulator 1, a content information extractor 2, a product expression model accumulator 3, a product expression model designator 4, a reference information extractor 5, a processing information determiner 6, and a processing executor 7.

The content data accumulator 1 is a recording medium accumulating files (data) of content owned by the user. Here, content is, for example, a piece of photographic or video data taken at an event, a piece of photographic or video data acquired from the Internet or similar, a piece of text or music data, or a piece of user-created or otherwise acquired data. The content data accumulator 1 is, for example, a large-capacity media disc such as an HDD or DVD, or a storage device such as a semiconductor memory or the like.

The content information extractor 2 extracts later-described attribute information from the content, including device metadata, analysis metadata, usage metadata, and so on.

The product expression model accumulator 3 is a recording medium accumulating product expression models, each model indicating how the product is to be expressed. Each product expression model includes processing information, indicating a processing method for processing the content, and reference information corresponding to the processing information. The reference information is attribute information sought in content matched with the product expression model should include. Accordingly, the product expression model is, for example, a piece of processing information indicating a processing method of cutting out an image of a person in units of detected faces, paired with reference information pertaining to clothing and gender of the person. Here, items pertaining to the reference information (e.g., clothing, in the aforementioned reference information pertaining to clothing) that may be changed to suit the content are termed adjustable items. The product expression models accumulated in the product expression model accumulator 3 each have reference information that includes at least one adjustable item. The product expression model accumulator 3 is, for example, a large-capacity media disc such as an HDD, or a storage device such as a semiconductor memory or the like.

The product expression model designator 4 designates at least one product expression model among the product expression models accumulated in the product expression model accumulator 3. The product expression model is designated as follows. Specifically, an event content theme of the product expression model, determined in advance by the creator of the product expression model or by a specific operator, is compared to an event content theme of the content. The product expression model is selectively determined when the event content theme of the content and model match or are highly similar. The event content theme of the content is an event named acquired from the usage metadata, and is input directly by the user. When the usage metadata are unable to specify the event, an estimation is performed using time, place, and similar photography time information acquired from photographic device metadata, and using participating person, situation, and photographic object information acquired from analysis metadata. For example, a typical event such as a journey or party, or a specific event such as a birthday party, wedding reception, sporting match, picnic, ski trip, school entrance ceremony, or the like may be specified or estimated.

The reference information extractor 5 extracts reference information from the product expression model designated by the product expression model designator 4. Specifically, reference information is acquired, the reference information being adjustable items each paired with a referent value, for the processing information indicating the processing method for the content and for the product expression model, a portion of the product expression model being content layout and additional decoration that does not alter the content itself (hereinafter termed additional processing information).

The processing information determiner 6 corrects the product expression model based on the attribute information of the content extracted by the content information extractor 2 and on the reference information extracted by the reference information extractor 5, and determines a type of content processing appropriate to the corrected product expression model and the content. Specifically, the processing information determiner 6 operates as follows. First, the processing information determiner 6 compares the reference information and the attribute information of the content for each adjustable item, and computes a difference.

Next, the processing information determiner 6 creates a correction candidate for the processing information, the additional processing information, or both, of each adjustable item, according to the difference so computed. Finally, the processing information determiner 6 determines whether or not to apply the correction candidates so created, and determines the processing information and the additional processing information, i.e., determines the correction for the product expression model and determines the processing information for the content.

The processing executor 7 processes the content in accordance with the corrected product expression model determined by the processing information determiner 6. Specifically, the processing executor 7 processes the subject content using the corrected processing information, and performs a specific viewing format conversion using the corrected additional processing information. For example, the processing may be a target content decoration, digital album arrangement, or slide show conversion. The specific viewing format is a display format that can be played back by a viewing device, e.g., an image format such as JPEG, a video format such as MPEG, or a display format such as HTML.

(Attribute Information)

The content attribute information is described below. The content attribute information includes, as mentioned above, device metadata, analysis metadata, usage metadata, and so on.

The device metadata are pieces of attribute information in metadata assigned by a content acquisition device. The metadata assigned by the content acquisition device are, for example, Exchangeable Image File Format (hereinafter, EXIF) information, video expansion metadata, Compact Disc DataBase (hereinafter, CDDB) metadata, ID3 tags, or similar music metadata. The above-described content attribute information in the metadata is, for example, photography date information, Global Positioning System (hereinafter GPS) information serving as photography location information, photography mode information, camera parameter information for various photography times, photography method information such as sensor information, music information such as title and artist information, audio base wavelength information, quantised bit number, bit rate, number of channels, and recording mode information indicating a subset of these.

The analysis metadata are metadata obtained using a content analysis method. The metadata obtained using image analysis include, for example, low-level features that are fundamental to the image, such as edges, colours, and textures, and high-level features expressing the shape of an object, such as local features that are unique to an item. The analysis metadata are, for example, photographic objects such as faces, people, or items within an image, and may use results of identifiable categories of specific situations, such as a beach, the woods, indoors, and so on. For video content, chronological movement and scene analysis information may be used as analysis metadata. Also, for music content, melody analysis information or similar may be used as analysis metadata. Likewise, results of audio analysis such as audio, paralinguistic, environmental, and designated source information may be used as analysis metadata for audio and for video content.

The usage metadata are metadata assigned through the use of the content, being user-assigned information, usage history, and the like. Examples include user-assigned information such as an event name associated with the content, names of individuals photographed in the content, and a photographer name, and usage history information such as viewing frequency of the content, and names of individuals or communities with whom a product created from the content is shared through the Internet or similar, as well as the type, location, and creator of such a product.

(Operations)

The operations of the content processing device 10 pertaining to the present invention are described in detail, below.

Figure 2:
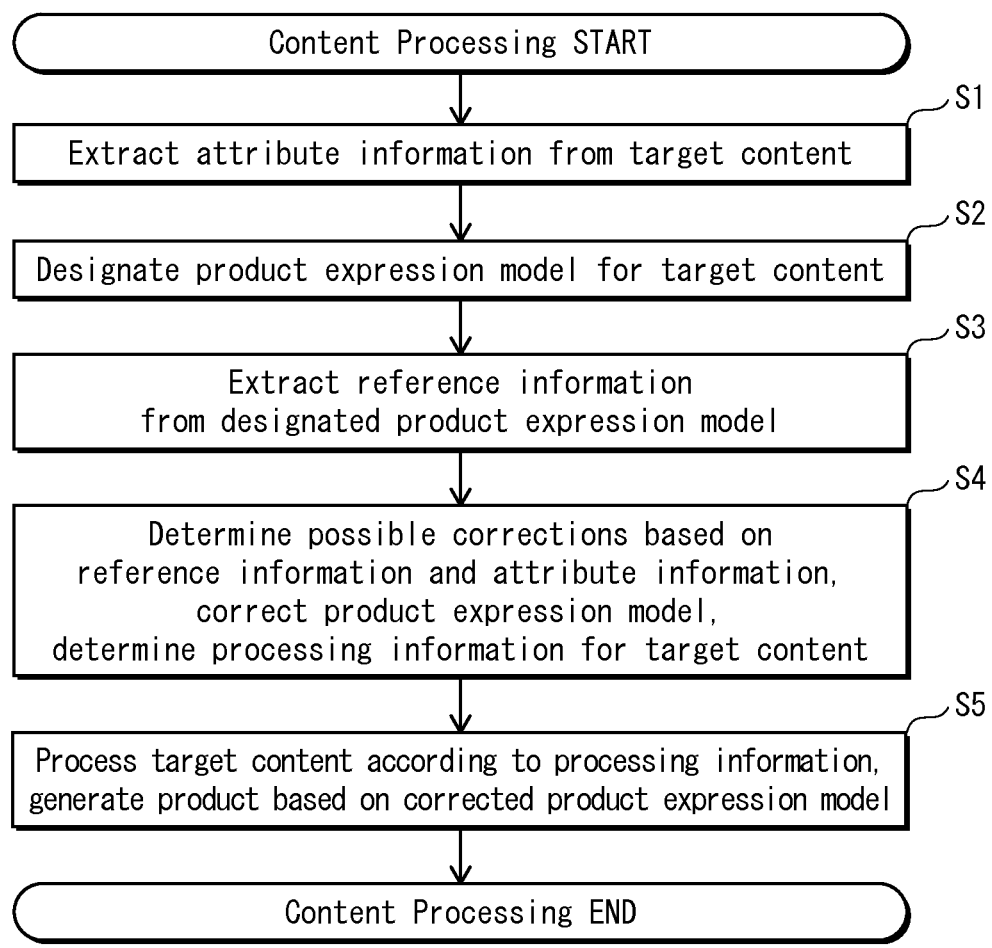
FIG. 2 is a flowchart indicating steps of content processing pertaining to Embodiment 1.

FIG. 2 is a flowchart indicating the steps executed during the content processing performed once the corrected processing information is determined by correcting the product expression model according to the content attribute information and the reference information.

Once the user selects target content for viewing, the content processing device 10 acquires the target content from the content data accumulator 1, and the content information extractor 2 extracts the attribute information from the acquired target content (S1). The attribute information extracted by the content information extractor 2 is the above-described device metadata, analysis metadata, usage metadata, and so on.

FIG. 3 shows an example of device metadata. FIG. 3 shows a content number, assigned to each piece of content, and device metadata. The file name and data types, as well as the time of retrieval, are shown as attribute information. When the content is image or video data, the latitude and longitude information acquired from the GPS information at photography time, International Organization for Standardization (hereinafter, ISO) sensitivity information used in brightness adjustments at photography time, exposure information adjusted for viewing as appropriate to the brightness, camera type information, and camera mode information. Also, when the content is audio data, the sound quality mode of the recording device is shown.

FIG. 4 shows an example of analysis metadata. FIG. 4 indicates analysis metadata for each of the content numbers assigned to the pieces of content. For image content, image features such as colour information and edges are indicated. Here, each of the edges is a piece of texture information, which is an intra-picture statistical value computed at predetermined angular increments for an edge feature detected as a line segment within the image. FIG. 4 also shows face information obtained via face recognition technology or the like, indicating the presence of a face, as well as orientation and quantity thereof, as attribute information. Further, FIG. 4 also shows situation information obtained via situation detection or the like, and lists objects obtained by object detection or the like as attribute information. For video data and audio data content, audio features and tune information are indicated as attribute information.

FIG. 5 shows an example of usage metadata. FIG. 5 shows user-applied information, such as a photography event name for the content, names of persons appearing in the content, and other user-applied tag information. Also, a play count on a display device, a product such as a digital album or slideshow created using the content, names or Social Networking Services (hereinafter, SNS) with which the content has been shared, and so on are indicated as usage metadata.

Next, the content processing device 10 performs a S2 product expression model designation process on the target content (S2). Specifically, the product expression model designator 4 designates a product expression model according to the photographic subjects, type of background, or event content theme of the content. FIG. 6 shows an example of product expression models accumulated in the product expression model accumulator 3. FIG. 6 lists an expression number allocated to each product expression model, as well as reference information including an adjustable item and a referent value, processing information indicating content to be processed, and additional processing information indicating decorations, transition effects, and layout. The referent value corresponds to one of the adjustable items in the reference information. For example, given reference information for which a number of faces is given as one, the number of faces is the adjustable item and the corresponding referent value, which indicates the number itself, is one.

Figure 8A:
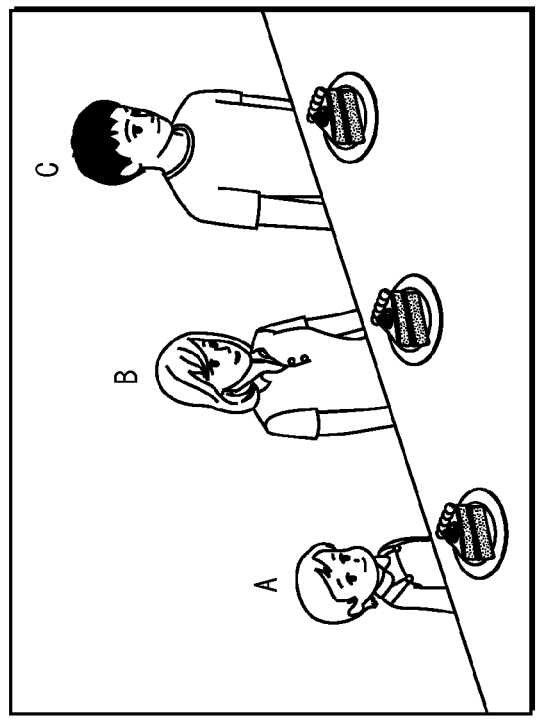
FIGS. 8A and 8B illustrate an example of content and a product generated therefrom, pertaining to Embodiment 1.

The following describes the content subject to processing as that shown in FIG. 8A (with the attribute information being content ID00000001) and the designated product expression model being model mID000001.

Next, the content processing device 10 activates the reference information extractor 5. The reference information extractor 5 extracts the adjustable item and the referent value corresponding thereto from the reference information written in the designated product expression model (S3). As shown in FIG. 6, the reference information "Number of Faces: 1" is extracted given that the adjustable item for model mID000001 is a number of faces.

The content processing device 10 then activates the processing information determiner 6. The processing information determiner 6 determines the corrections to be applied to the product expression model based on the attribute information of the target content extracted by the content information extractor 2 and on the reference information extracted by the reference information extractor 5 (S4). Specifically, the following operations are performed.

Figure 7:
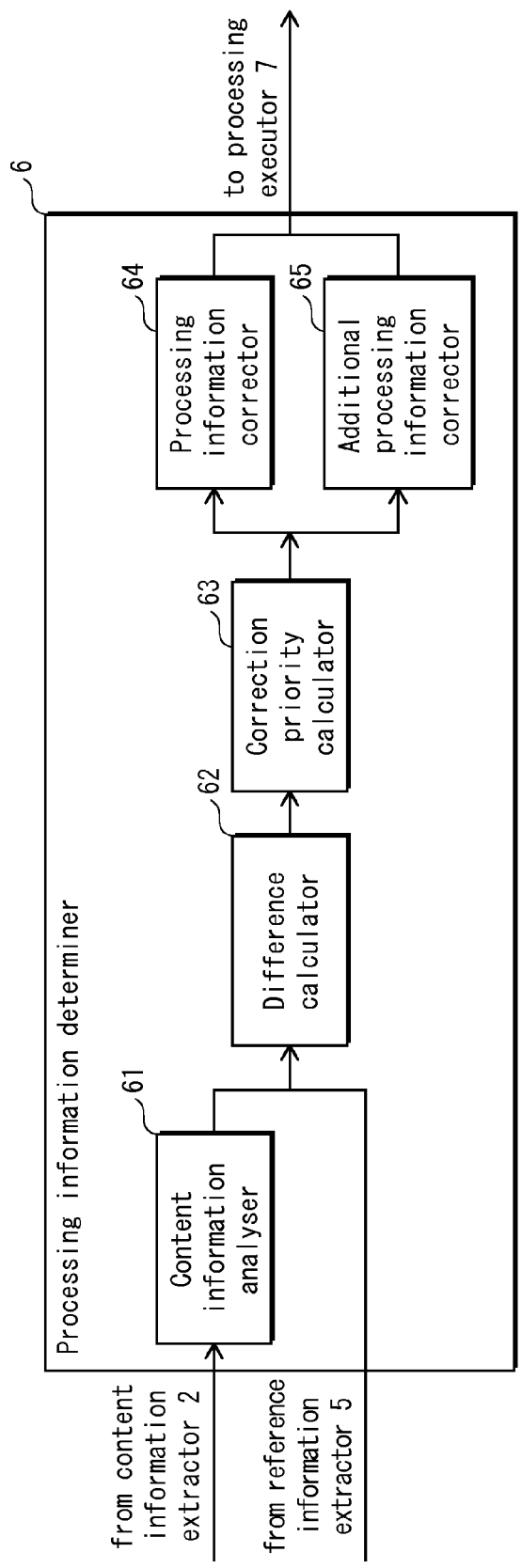
FIG. 7 is a block diagram indicating the functional configuration of a product expression model corrector 6 pertaining to Embodiment 1.

First, the processing information determiner 6 computes a difference between the reference information and the attribute information. Specific operations of the processing information determiner 6 are explained with reference to the sample functional configuration shown in FIG. 7. FIG. 7 is a functional block diagram of the processing information determiner 6. The processing information determiner 6 includes a content information analyser 61, a difference calculator 62, a correction priority calculator 63, a processing information corrector 64, and an additional processing information corrector 65. The content information analyser 61 performs extraction and analysis of an attribute value corresponding to the adjustable item, based on the attribute information of one or more pieces of target content. For example, given that the adjustable item is the number of faces, then the attribute value is three when the attribute information reads "Number of Faces: 3". Also, for example, given that the adjustable item is a photography time slot, then the content information analyser 61 calculates the photography time slot for use as the attribute value based on a photography timestamp in the attribute information.

The difference calculator 62 calculates a difference between the reference information extracted by the reference information extractor 5 and the attribute value calculated by the content information analyser 61. Given the example shown in FIG. 4, where the number of faces for ID00000001 is three, "Number of Faces: 3" is calculated from the image attribute information, and the difference is calculated with respect to the reference information reading "Number of Faces: 1". As such, difference information reading "Number of Faces: +2" is obtained.

Next, the processing information determiner 6 determines various corrections to the adjustable items, using the difference information for the target content calculated by the difference calculator 62. The correction priority calculator 63 generates candidates for corrections to the processing information and to the additional processing information based on the difference information, then assigns a priority to each candidate so generated. The priority is a value added to each candidate for corrections to the processing information, the additional processing information, or both, and is an index used to decide whether or not to perform the candidate correction. In the present Embodiment, Priority: 2 (standard) serves as a threshold. Here, for model number mID000001, the priority for the difference in number of faces is established such that a negative value has Priority: 1 (low), a zero value has Priority: 2, and a positive value has Priority: 3 (high). Accordingly, a correction candidate for "Number of Faces: 3", such as a correction candidate for extracting processing information reading "three upper bodies" and correcting the additional processing information so that the three upper bodies are arranged to each face a cartoon character in a triangular layout, is generated with Priority: 3.

Next, the processing information corrector 64 and the additional processing information corrector 65 determine that correction candidates with a priority equal to or exceeding the threshold are corrections for the product expression model. In the above example, only one correction candidate exists with a priority of three. Thus, a determination is made to execute the correction as described above. That is, the processing information corrector 64 determines that the processing information for extracting the upper bodies corresponding to each of the three detected faces is the corrected processing information. Likewise, the additional processing information corrector 65 determines that the following is the corrected additional processing information. Specifically, the faces in image ID00000001 are all oriented rightward. Thus, given persons A, B, and C, decorations showing leftward-facing cartoon characters are selected so as to be oriented toward the faces, and the upper bodies of persons A, B, and C are magnified or reduced in size so as to be of equal size in the processed content. The content layout is triangular because the number of faces is three, and a triangle is the n-sided polygon for which n=3.

Figure 8B:
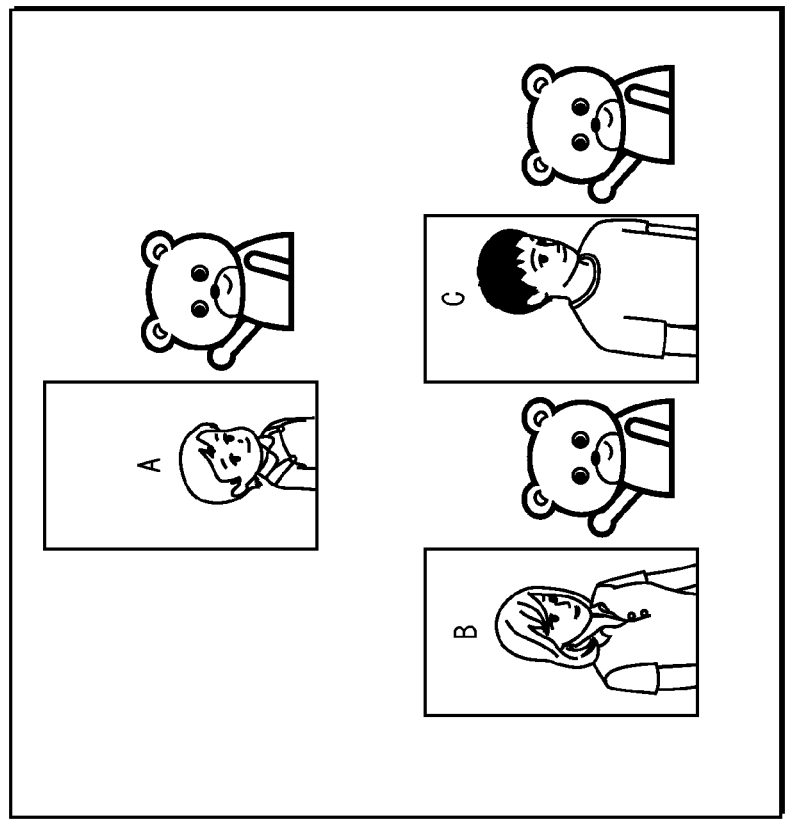

Next, the content processing device 10 initiates the processing executor 7. The processing executor 7 performs content processing according to the processing information and the additional processing information, and stores the result (S5). That is, the content shown in FIG. 8A is processed into FIG. 8B in accordance with the corrected product expression model as determined in step S4, and the processing information. After processing, the processed content is viewable on various display devices.

(Supplement)

(1) Processing Initialisation by Content Processing Device 10

Embodiment 1 describes the initialisation of the processing by the content processing device 10 as occurring when the user selects content for viewing, thus prompting the acquisition of the target content from the content data accumulator 1. However, the target content may also be acquired from the content data accumulator 1 when the processing by the content processing device 10 is initialised upon prompting as follows.

For example, the content processing device 10 may monitor the content accumulated in the content data accumulator 1 and be prompted when new content is accumulated into the content data accumulator 1. The processing by the content processing device 10 may also be initialised at a predetermined time. Alternatively, the content processing device 10 may begin processing when a predetermined condition is satisfied. For example, the content processing device 10 may be prompted by the accumulation into the content data accumulator 1 of content with attribute information that is identical or similar to the reference information of a predetermined product expression model. Likewise, the content processing device 10 may be prompted by the accumulation into the content data accumulator 1 of a content set made up of pieces of content having similar attribute information.

(2) Device Metadata

In Embodiment 1, described above, the device metadata are described as shown in FIG. 3. However, other forms of device metadata are also applicable, such as the following.

For example, photography timestamp information indicating a time of photography may be included as attribute information for image or video data content. Also, genre or the like may be included as attribute information for music content.

(3) Analysis Metadata

In Embodiment 1, described above, the analysis metadata are described as shown in FIG. 4. However, other forms of analysis metadata are also applicable, such as the following.

In FIG. 4, the colour information is an intra-image statistical value computed from RGB colour values. However, hue information for the HSV or YUV colour spaces may also be used, as well as statistically weighted information such as a colour histogram or a colour moment.

FIG. 4 also uses low-level features, such as colour and texture information. However, high-level features expressible as features of the photographic object are also applicable. Here, high-level features are features of a local region centred on a characteristic point, or features expressing the shape of an item. Specifically, these include features obtained using SIFT (Scale-Invariant Feature Transform), SURF (Speeded Up Robust Feature), and HOG (Histograms of Oriented Gradients).

Also, FIG. 4 indicates face information obtained using face recognition technology, indicating attribute information such as the presence of faces and the quantity or orientation thereof. However, the attribute information may also indicate face size, clothing colour, or shapes. Attribute information from analysis based on person recognition, in which images pertaining to a person are analysis, may also be used. Alternatively, typical object recognition such as vehicle detection, generic object recognition, pet detection of a dog, cat, and so on, may be used as the attribute information for the content.

The attribute information for a region of an image may be generated by applying a region information calculation method such as Saliency Map or Depth Map, and used as region information for a specific photographic object or background scenery.

Also, for audio and video content, audio, paralinguistic, environmental, and designated source information may be used as attribute information taken from audio analysis using an acoustic model.

(4) Usage Metadata

In Embodiment 1, described above, the usage metadata are described as shown in FIG. 5. However, other forms of usage metadata are also applicable, such as the following.[0057]

For example, a common ID may be used as usage metadata for individual events. Specifically, an ID may be assigned to each photography event that is common to the dataset of content photographed at a single event. In such a case, the usage metadata may be treated individually for each photography event, i.e., as one piece of usage metadata corresponding to the dataset, or may be treated as a piece of usage metadata for each piece of content.

(5) Product Expression Model Designation (S2)

Embodiment 1, above, describes the product expression model designator 4 as designating the product expression model according to a photographic object in the content, a type of background, or a photographic event content theme. However, the product expression model designator 4 may also designate the product expression model using the following methods.

For example, the product expression model designator 4 may display a list of product expression models stored in the product expression model accumulator 3, as shown in FIG. 6, and have the user input a product expression model.

Alternatively, the product expression model designator 4 may designate a product expression model determined in advance for a given photography event or theme, having been selected by the user upon display of a list of photography events and themes.

Furthermore, the product expression model designator 4 may extract, from the product expression model accumulator 3, product expression models each having a theme identical or similar to a theme of the content, and designate a product expression model selected by the user from among the product expression models so extracted.

(6) Product Expression Model

Embodiment 1, above, describes the product expression model as shown in FIG. 6. However, the following product expression model may also be used.

FIG. 6 shows an example of product expression models having one each of the adjustable items and referent values. However, two or more product expression models may be paired, and a product expression model having two or more adjustable items may also be generated.

(7) Content Theme Extraction Method

Embodiment 1, above, describes determining the product expression model according to the event content theme for the content. The method of acquiring the event content theme for the content is described below.

For example, the content processing device 10 may acquire an event name, input directly by the user, from the usage metadata, and thus acquire the event content theme for the content. Alternatively, an estimation may be performed using time, place, and similar photography time information acquired from the photographic device metadata, and using participating person, situation, and photographic object information acquired from the analysis metadata.

The details of theme estimation operations are described below.

For example, time information, latitude and longitude information, and the like are extracted from the device metadata as statistical units for a piece of content, and an event name of "Autumn in Arashiyama, Kyoto" is estimated from the set of time and location information. As another example using the analysis metadata, a scenery-based theme such as "indoors" or "snowscape" may be taken from statistics of the target piece of content. Further, a combination of faces or objects may be used to estimate an event name such as "Family Party at Home" given information such as "indoors", "three family members", "cake", and so on. Also, when the usage metadata indicate that only family members appear, then a title of "Family at the Park" may be estimated through combination with location information from the device metadata. Similarly, a title of "Family Picnic at the Park" may be estimated by further including scene information from the analysis metadata. An appropriate event title and theme may be estimated by storing a list of selections for an event name or theme to be determined, each selection being taken from a combination of features obtained from the device metadata, the analysis metadata, and the usage metadata, and then using the attribute information made obtainable through the list.

Any estimation based on acquired usage metadata and on the attribute information is usable as the method of obtaining the event content theme for the content. For example, estimation may be performed based on the attribute information only when the usage metadata are not available.

As described above, attribute information for the content used in selecting an appropriate product expression model is obtained by using one or more of the device metadata, the analysis metadata, and the usage metadata to obtain a theme for a set of content to which a single product expression model is applied.

(8) Difference Information

In Embodiment 1, above, the difference information indicates a difference in quantity of detected faces. However, no such limitation is intended. The difference information need only correspond to the adjustable item. For example, the adjustable item pertaining to an image may be a quantity of full-body human figures, a ratio of photographic objects to background scenery, or an item pertaining to faces, persons, situations, items, or other examples. Also, the adjustable item pertaining to audio information may be vocal volume, a ratio of music to noise, or an item pertaining to audio, paralinguistic, environmental, and designated source information. Further, when the adjustable item pertains to interpersonal relationships, family information, friend information, SNS information, and online information such as parental relationships, friendship, SNS friend status, and so on may be used. Additionally, the attribute information is not limited to information obtained directly from the content. A plurality of values obtained by directly analysing the content may be combined to obtain the attribute information. For example, for the aforementioned parental relationship example, a determination regarding the existence of a parental relationship may be made using the usage metadata pertaining to family information, face recognition results, and face frequency information based on such results.

Also, rather than the content information analyser 61 calculating the content information based on the attribute information extracted by the content information extractor 2, the content information extractor 2 may directly calculate the content information with no content information analyser 61 being involved.

(9) Product Expression Model Correction

In Embodiment 1, above, the processing information is described in a case where the processing for extracting upper bodies corresponding to each of three detected faces. However, no such limitation is intended. The processing information may also indicate the processing method as follows. For example, the processing may be to divide photographic object regions, such as dividing an image into a photographic object regions for each detected face such that each region includes the entire body of a detected person. Also, processing information for generating a single photographic object by uniting two photographic objects may be applied to cases where the reference information indicates that the distance between two photographic objects is 0.5 m and the attribute information indicates a distance between two photographic subjects of 2 m. Further, processing information for colour conversion may be applied to an entire image or to a background region of the image so as to create the appearance of a sunset when the reference information indicates a time slot of evening and the attribute information indicates a timestamp of 16:00.

Also, for video, audio, or similar content, the following processing may be performed. For example, processing information of partially deleting a photobombed scene from a video, or of converting a frame showing only a group of photographic object with a friendship relation into a static image, may be applied when the reference information indicates photographic objects with a friendship relation and the content is video that includes the photographic objects as well as a photobomber. Also, processing information of applying a low-pass filter to video or audio may be used when the reference information indicates no ambient sound, and the content is video or audio that indicates an environment of high-frequency noise.

Embodiment 1, above, describes the method of correcting the additional processing information as adding the upper body of a leftward-facing cartoon character so as to be oriented toward each of a plurality of extracted upper body images. However, no such limitation is intended. The change to the additional processing information is not limited to decoration, but may also apply to backgrounds, transition effects, and layouts. For example, a video or animated image may be used as a decoration applied to a video used as a replacement for a still image. Also, the portion to be changed is not limited to the portion stored in the product expression model accumulator 3 by the content processing device 10. For example, the portion may be acquired from a server over the Internet or the like.

In Embodiment 1, above, only one item is listed in the difference information, and the correction method for the processing information and the additional processing information is described as being of only one type. However, no limitation is intended. For example, when the adjustable item is a number of photobombers and the difference information is available, the quantity of corrections may be adjusted in response to the number of photobombers, or the correction may involve trimming an image such that the number of photobombers is that of the referent value. In such situations, the correction to the product expression model is determined using the later-described priority.

Embodiment 1 is described using an example of image content. However, a similar correction is also determinable for a group of content including a video taken at the same time as an image, an appended comment, and background music. When appropriate corrections to the processing information or the additional processing information are not possible for the difference information, the content processing device 10 may acquire corrected processing information and additional processing information, or a correction method for the processing information and the additional processing information, from an external device via a network. For example, the content processing device may search the Internet to obtain a correction method for the processing information and the additional processing information and download an appropriate such method. Also, the content processing device may download a correction method for the processing information and the additional processing information from a network in advance, store the method in the product expression model accumulator 3, and read the method when needed.

(10) Correction Priority

In Embodiment 1, above, a case is described where there is only one piece of difference information and only one candidate for correction. However, no such limitation is intended.

For example, when a plurality of correction candidates are available for a single piece of difference information, the correction candidate having the highest priority may be executed alone. For instance, when, as described above, the adjustable item is a number of photobombers and difference information is available, then a candidate for increasing the number of corrections so as to correspond with the number of photobombers may have a priority of three, and a candidate for trimming the image so as to reduce the number of photobombers to match the referent value may have a priority of two. In such a case, only the former correction is applied.

Alternatively, when the product expression model includes two or more pieces of reference information, and two or more pieces of difference information for one piece of content, then correction candidates may be created for each piece of difference information, and the priority may be used to determine whether to apply all of the corrections, a subset of the corrections, or none of the corrections. For example, when the adjustable items are the orientation of an upper body of a person and the size of a dog, and the content includes three persons and one dog, then the correction priority is established as follows. Specifically, one or more correction candidate is created for each of the three persons, and a correction priority is established for each correction candidate. Also, one or more correction candidate is created for the dog, and a correction priority is established for each correction candidate. That is, at least four correction candidates are generated for the content, and a priority is established for each correction candidate. In such a case, the processing information determiner 6 may use a fixed threshold value, or may use a threshold that is a fixed proportion of the total priority for all corrections.

In Embodiment 1, above, expression model mID000001 assigns priority to the difference value for the number of faces such that a negative number has Priority: 1 (low), zero has Priority: 2 (standard), and a positive number has Priority: 3 (high). However, no limitation is intended. The priority may be determined as follows. For example, although an n-polygon layout in which extracted upper body areas each corresponding to a detected face is easy to create when five or fewer faces are detected, such an n-polygon layout is difficult when six or more upper bodies are extracted. As such, Priority: 3 may be assigned when the difference information for the number of faces is within a range of +1 to +4, inclusive, and Priority: 0 (very low) may be assigned when the difference information is +5 or greater.

The priority of each correction candidate and the conditions for determining whether or not to execute the correction candidates may be determined in advance for each product expression model, or stored in the content processing device. When determined in advance for the product expression models, the creator of each product expression model is able to determine the range of corrections for the product expression model. Also, when the product expression model has no priority for a given correction candidate, then the content processing device may use a priority from another product expression model having identical or similar adjustable items and reference information, or use the priority of a product expression model by the same creator. Also, as described above, the priority for each correction candidate may, of course, be a value dependent on the adjustable item and corresponding difference value, or on the difficulty of processing the content or the additional processing.

Accordingly, the determination of whether or not to apply a correction is made according to the difficulty of applying the correction to the product expression model, or the product expression model is correctible only within a tolerance range established by the creator of the product expression model.

(11) Processing Non-Image Content

Embodiment 1, above, describes a situation where the content is only an image, or is an image combined with a video taken simultaneously, an appended comment, or a collection of background music. However, no limitation is intended. For example, the content may be only a video, or only music, or a combination of video and music.

For example, a product may be generated as follows. When the content is a combination of a video taken at an outdoor performance of a piece of original music and a studio recording of the same piece of original music, the reference information reads "environment: indoors", and a product expression model performs processing of cutting out a segment of the video from the start to the end of the performance and replacing the audio with the studio recording. As such, the difference information reading "environment: outdoors" is used to correct the product expression model and execute processing of cutting out a segment of the video from the start to the end of the performance and replacing the audio with the studio recording, with outdoor sound effects added.

(Conclusion)

As described above, the product expression model is corrected according to the attribute information of the content. As such, a product expression model is used that is appropriate to the content, despite the content processing device not containing any ideally-suited processing information. Also, using the corrected product expression model enables the user to easily and effectively process the content into viewing form, without having to generate the processing information from scratch.

[Embodiment 2]

The present Embodiment describes the details of a method for performing content processing using a template defined by a product expression model. Components having the same functions as those of Embodiment 1 use the same reference numbers thereas, and explanations are omitted below.

Figure 9:
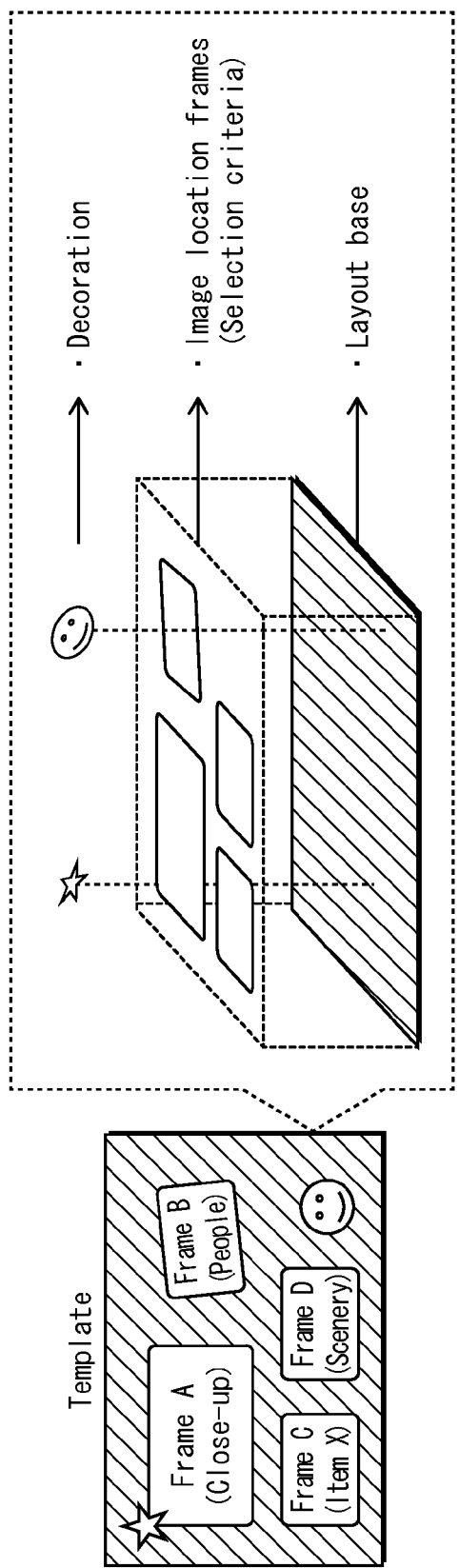
FIG. 9 illustrates an example of a template pertaining to Embodiment 2.

FIG. 9 shows an example of a template stored in the product expression model accumulator 3. The template shown in FIG. 9 is a template treating all target content as a single group.

Figure 10:
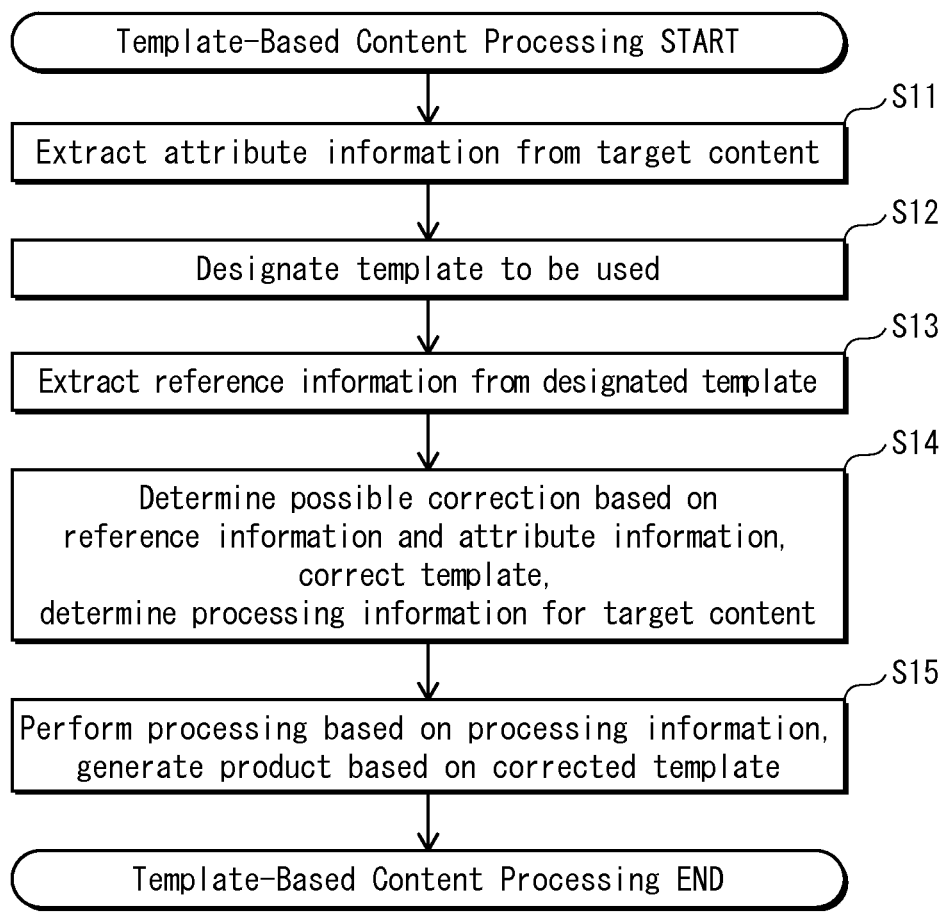
FIG. 10 is a flowchart indicating steps of content processing based on a template, pertaining to Embodiment 2.

The operations of the content processing device pertaining to the present invention are described below. FIG. 10 is a flowchart indicating the steps of content processing performed after the correction to the product expression model, based on the content attribute information and the selected template.

First, the content processing device begins the correction processing on the product expression model for the content stored by the user. The content processing device acquires the target content from the content data accumulator 1, and the content information extractor 2 extracts the attribute information from the acquired target content (S11). The extraction process is similar to that described above in step S1, and the resulting attribute information is also similar. The details thereof are thus omitted.

Next, the content processing device displays the product expression models accumulated in the product expression model accumulator 3 as a list a templates, and the product expression model designator 4 performs a template selection process using the subject content (S12). The template selection method is, for example, selecting a template that suits the user, or automatically selecting a template according to the photographic object, type of background, or event content theme in the content.

Figure 12:
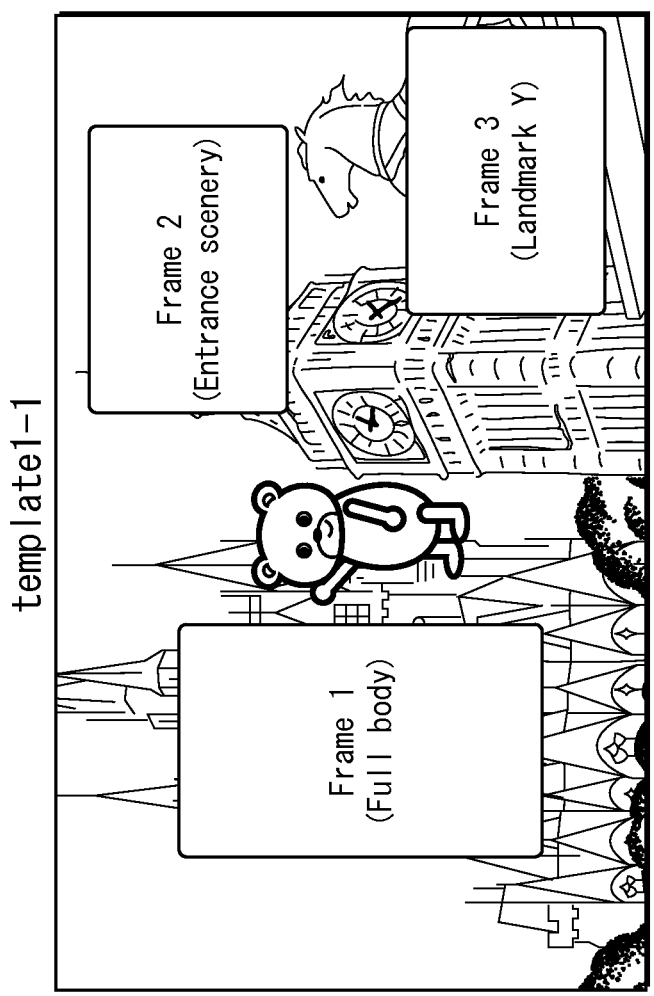
FIG. 12 illustrates an example of template 1-1, which is a selectable layout for a template.

FIG. 11 shows an example of selectable templates. As shown, each template is made up of divided scene units, each unit being a page in a digital album, a division in a slideshow, or similar. The scene units include selectable layouts, such as the example shown in FIG. 12 in which the content index and conditions, as well as the layout itself, are defined, and processing information, such as the examples of FIG. 13, listing processing. FIG. 11 shows an example in which the template includes three or more scene units. However, no limitation is intended. The template need only include one or more scene units. The selectable layout template 1-1 included in tID0000001 shown in FIG. 11 is illustrated in FIG. 12. The template 1-1 includes selectable layout information indicating three image frames, as well as image selection conditions and layout information for each frame. Processing mID000101 indicated in FIG. 11 is shown in FIG. 13. As shown, the processing information is listed for an image selected for each image frame along with the reference information therefor, and other additional processing information with the reference information therefor.

Next, the content processing device activates the reference information extractor 5 and the reference information extractor 5 extracts the reference information from the template (S13). The content processing device then activates the processing information determiner 6. The processing information determiner 6 determines the correction for the product expression model based on the attribute information for the target content extracted by the content information extractor 2, and on the reference information extracted by the reference information extractor 5 (S14). Specifically, the following operations are performed.

Figure 14:
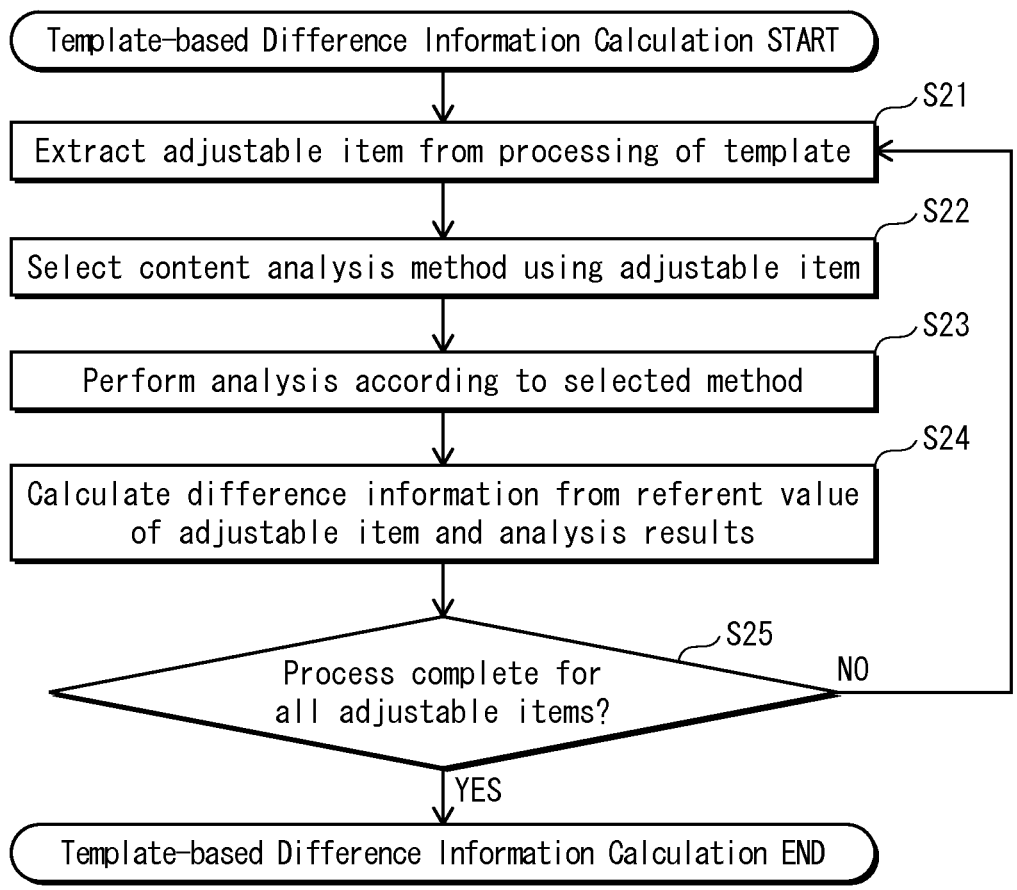
FIG. 14 is a flowchart indicating steps of a difference information calculation process based on a template, pertaining to Embodiment 2.

First, the processing information determiner 6 computes a difference between the reference information and the attribute information. FIG. 14 is a flowchart pertaining to the difference information calculation operations. The specific operations are described using template 1-1 from FIG. 12 and the processing mID000101 from FIG. 13. The images selected for frames 1 through 3 according to the selection criteria of the template 1-1 are shown in FIG. 15. The images of FIG. 15 are selected upon matching the selection criteria of the template 1-1, using the analysis metadata for the content. However, other images may also be selected using the attribute information for the content, or using arbitrary attribute information for the content, or a combination thereof.

As shown in FIG. 14, the reference information extractor 5 extracts the adjustable items from the additional content of the template (S21). The adjustable items are extracted as shown in FIG. 13 for each of the frames. Thus, the processing information determiner 6 sequentially extracts a number of faces as the adjustable item for frame 1. The processing information determiner 6 then selects an analytical method required for the adjustable item (S22). The content information analyser 61 performs analysis according to the selected analytical method and calculates the attribute information for the content, being comparable to the adjustable item (S23). For example, the processing information determiner 6 selects face recognition and person recognition as analytical methods for frame 1, and the content information analyser 61 calculates that the number of faces is two. For frame 2, the processing information determiner 6 selects sky proportion calculation as the analytical method, and the content information analyser 61 calculates that the sky proportion is 0.4. For frame 3, the processing information determiner 6 selects background similarity determination as the analytical method, and the content information analyser 61 calculates that the similarity is 0.5. The analytical methods may be defined by the template, or the content processing device may determine an analytical method corresponding to the adjustable item in advance.

Next, the difference calculator 62 calculates difference information that is the difference between the referent value for the adjustable item and the results of the analysis calculated in step S23. For instance, the difference calculator 62 calculates Number of Faces: +1, given that for frame 1, the referent value is Number of Faces: 1 and the analysis results read Number of Faces: 2. For frame 2, the difference calculator 62 calculates Sky Proportion: −0.1, given that the referent value is Sky Proportion: 0.5 and the analysis results read Sky Proportion: 0.4. For frame 3, the difference calculator 62 calculates a background similarity of −0.5, given that the referent value is Background Similarity: 1 and the analysis results read Background Similarity: 0.5. The processing information determiner 6 then checks whether or not processing is complete for all adjustable items, i.e., for each of the frames. If incomplete items remain, the process returns to step S21. If all items are complete, the difference information calculation process ends (S25). For example, the processing ends when the difference information has been calculated for all adjustable items by repeating the process three times, for frames 1 through 3.

Figure 16:
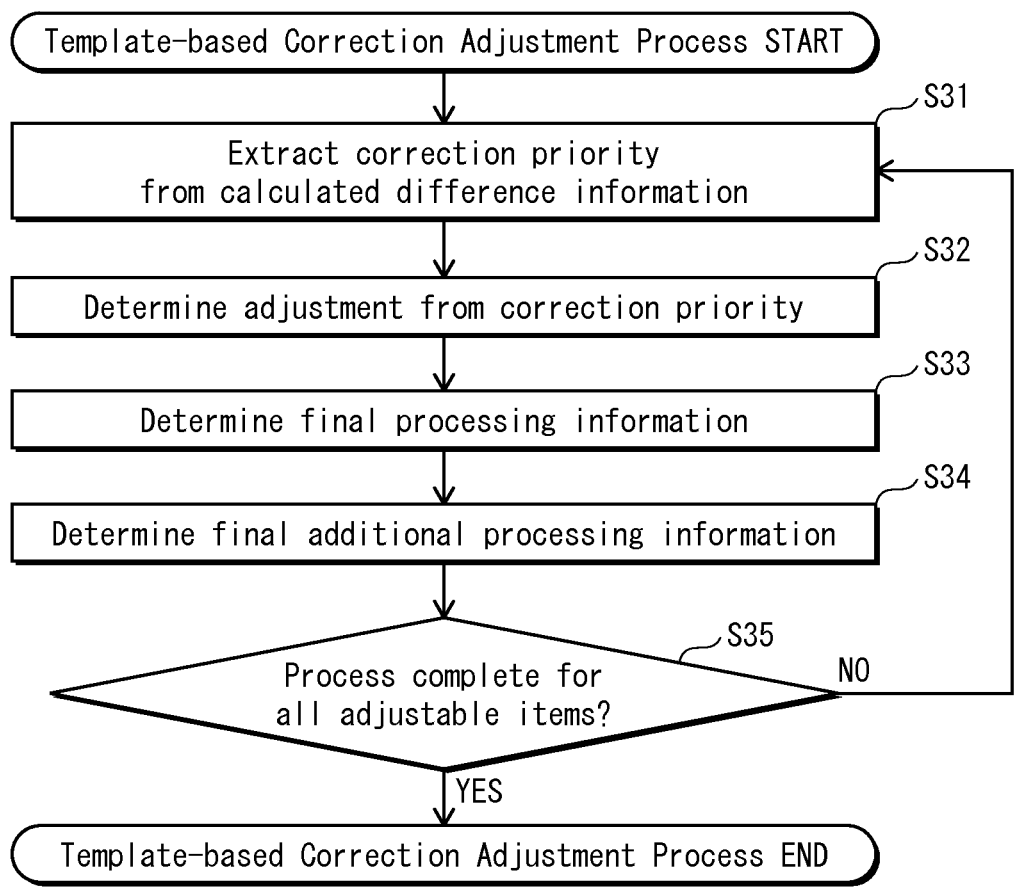
FIG. 16 is a flowchart indicating steps of a correction adjustment process based on a template, pertaining to Embodiment 2.

Next, the processing information determiner 6 determines the corrections to the adjustable items, using the difference information for the target content calculated by the difference calculator 62 (S14). FIG. 16 is a flowchart pertaining to the correction determination operations.

The specific operations are described using template 1-1 from FIG. 12, the processing mID000101 from FIG. 13, and the selected images from the example of FIG. 15. As shown in FIG. 16, the correction priority calculator 63 calculates a correction priority for each correction candidate generated from the calculated difference information and the adjustable item (S31). The calculated correction priorities are given in FIG. 17. Next, the correction priority calculator 63 determines the corrections according to the priority (S32). As shown in FIG. 17, for the correction candidates having a priority of two or greater, content processing, decoration, and layout are all selected for frame 1, which requires person area extraction and cartoon character addition, content processing is selected for frame 2, which requires a change to the sky proportion, and layout is selected for frame 3, which requires a background image resembling the selected image. The method for calculating the priority according to each adjustable item is written into the template.

Figure 18:
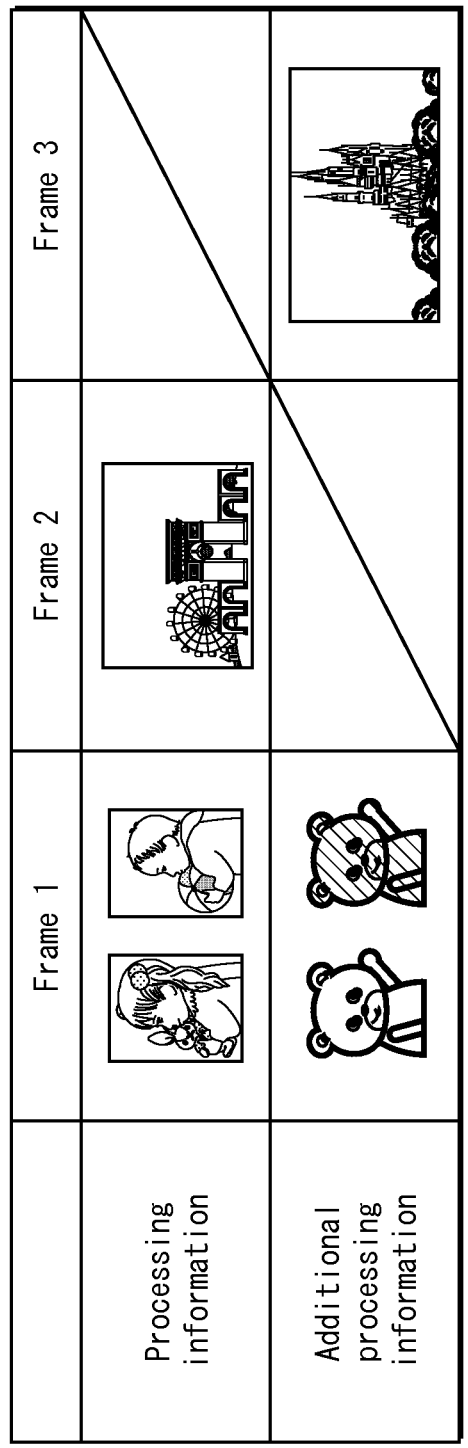
FIG. 18 indicates examples of final processing information and additional processing information for the content pertaining to frames 1 through 3.

Next, the processing information corrector 64 and the additional processing information corrector 65 determine the final processing information for the content, and the final additional processing information (S33). For frame 1, the processing information corrector 64 takes extraction of the upper body area as the corrected processing information, given that only the upper body is present. The additional processing information corrector 65 takes adding the upper body of a cartoon character oriented rightward, given that the face is oriented leftward, and arranging the layout such that the upper body images are vertically aligned, as the corrected additional processing information. For frame 2, the processing information corrector 64 takes additional processing of extracting, from the image, a region in which the sky proportion is 0.5 so as to maximise the surface area thereof as the corrected processing information. For frame 3, the additional processing information corrector 65 takes selecting an image resembling the selected image among selectable background bases as the additional processing information. Here, the image is selected from among background bases because a background base having a certain level of similarity exists. However, when no background base has the level of similarity, corrected additional processing information of taking the next-priority action and searching for an appropriate download on the Internet is also possible. The processing information determiner 6 then checks whether or not processing is complete for all adjustable items. If incomplete items remain, the process returns to step S31. If all items are complete, the correction adjustment process ends (S35). For example, the processing ends when the correction adjustment has been calculated for all adjustable items by repeating the process three times, for frames 1 through 3. FIG. 18 indicates the final processing information and additional processing information for frames 1 through 3.

Figure 19:
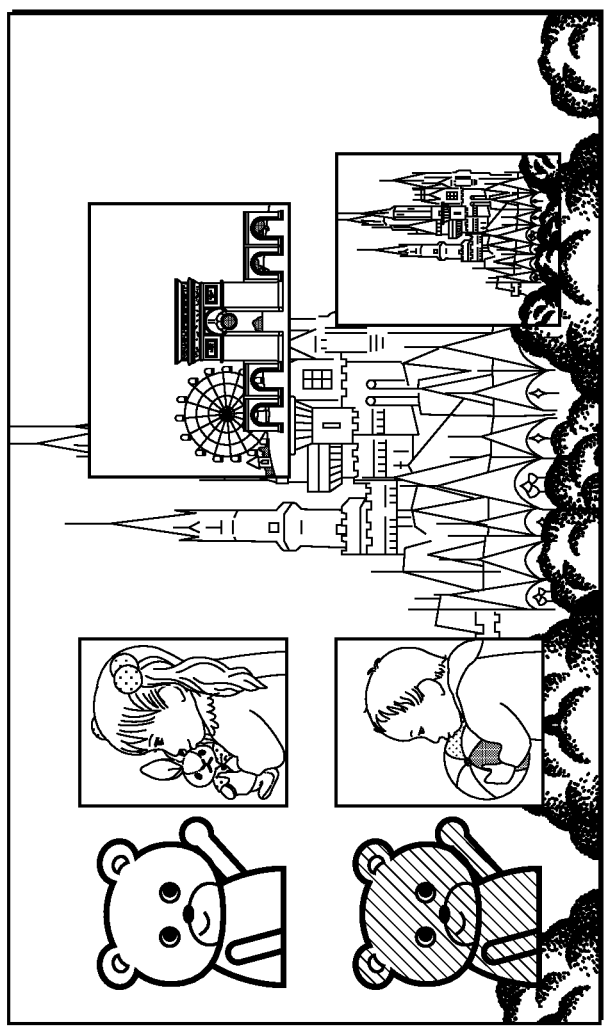
FIG. 19 illustrates an example of the final product produced with the product expression model corrected as indicated in FIG. 18.

Next, the processing executor 7 converts the content according to the corrected product expression model as determined by the processing information determiner 6, and stores the product so created (S15). FIG. 19 shows an example of the final processing results obtained from the corrections shown in FIG. 18 using template 1-1 from FIG. 12, the processing mID000101 from FIG. 13, and the selected images from the example of FIG. 15.

(Supplement)

(1) Templates

Embodiment 2, above, describes one template treating all target content as a single group, as shown in FIG. 9. However, no limitation is intended. When a plurality of different templates are applied to each of a plurality of groups, a given group of templates may be treated as a single template to be applied to each content group.

Also, a single template unit may be defined as one page when the content is a digital album, or as a template defining one scene of chronological transformation when the content is a slideshow that includes transition effects.

(2) Difference Information Calculation Method

Embodiment 2, above, describes calculating the difference information for all of the adjustable items extracted from the template. However, no limitation is intended. The difference information may also be calculated as follows.

For example, the adjustable items for which the difference information is to be calculated may be set in advance by the template creator or template user, or may be fixed by the user regardless of the template type.

Also, when a plurality of analytical methods are available for the adjustable item, the priority therefor may be assigned according to user-defined conditions, or the processing information determiner 6 may automatically detect analysable items in the content. For instance, when calculating information pertaining to a person and information of a detected face or body is to be used, then when no face is detectable or the face is only detected with low reliability while a person is detectable or is detected with high reliability, a determination is made to employ the analytical method that uses the detected person. Also, when templates resemble each other in terms of structure or the like, the analytical method is selectable according to whether or not the templates have a common analytical method or not. For instance, when a plurality of analytical methods are available, the selection may be made by assigning priority to the analytical methods in descending order of overlap between analytical methods defined in the templates that resemble each other.

Alternatively, the template may include content exemplars before and after processing, with no analytical method. This approach enables a difference from the content exemplar to be calculated. Of course, similar processing is also applicable to the product expression model for the content described in Embodiment 1, without using a template.

(3) Embodiment 2, above, only describes one type of correction method for correcting a product expression model. However, other correction methods are also possible, such as the following.

The processing information for processing the target content may be selected to match the template reference information from among processing such as expanding or contracting a clipped region of a photographic object or background according to specific image features or to a specific area. Also, the additional processing information may be adjusted after determining the processing information according to the description in the template, or the processing information may be determined after determining the additional processing information. Alternatively, each adjustable item may be fixed such that either of the processing information and the additional processing information is determined first. Also, balance adjustments to the size or layout may be performed across pieces of content. For instance, when the size of the faces differs within an image, some of the faces may be magnified or reduced to achieve uniform size. Also, when selected images differ in aspect ratio such that one is 4:3 while the other is 16:9, one may be adjusted to match the other by deleting a large area of unneeded background. Also, content adjustment is applicable to content such as a slides show, movie presentation, or the like that includes chronological transitions. In such cases, corrections for adjusting transition effects may be defined.

(Conclusion)

As described above, correcting the template according to the attribute information of the content enables an appropriate template to be applied to the content. The content processing device need not necessarily store an optimal template for the content. Using a corrected template enables the user to process the content into an effective viewable format for enjoyable viewing, without having to start from scratch.

[Embodiment 3]

The present Embodiment describes the details of a method for using specific attribute information of the content and dynamically adjusting the processing information suitable for a photograph event theme of the viewing target content in accordance with a product expression model corresponding to the specific attribute information. Components having the same functions as those of Embodiments 1 and 2 use the same reference numbers thereas, and explanations are omitted below.

A content processing device 20 pertaining to the present Embodiment comprises a content information extractor 12 and a product expression model designator 14, rather than the content information extractor 2 and the product expression model designator 4.

In addition to the functions of the content information extractor 2, the content information extractor 12 includes the functions of the content information analyser 61 for obtaining analysis information for specific attribute information. Likewise, the product expression model designator 14 includes a function for determining the product expression model according to the specific attribute information, in addition to the functions of the product expression model designator 4. The details are described later.

The operations of the content processing device 20 pertaining to the present invention are described below. First, the content processing device 20 obtains the target content from the content data accumulator 1 and the content information extractor 12 extracts the attribute information from the content (S1 or S11). Then, instead of step S2 or S12 from Embodiments 1 and 2, the product expression model designator 14 determines the product expression model according to specific attribute information among the attribute information for the content (S42). The reference information extractor 5 extracts the reference information for the product expression model (S3 or S13). The processing information determiner 6 determines possible corrections according to the attribute information and the reference information described by the product expression model (S4 or S14). The content processing device 20 then has the processing executor 7 execute the processing on the content in accordance with the corrected product expression model, as determined (S5 or S15). Here, the specific attribute information is information pertaining to a person, to a place, to an event, or the like. The present Embodiment describes the aforementioned step S42 in detail.

First, the content processing device obtains the target content from the content data accumulator 1 (S1 or S11). The content information extractor 12 performs an extraction process of extracting specific attribute information from the content so obtained. The specific attribute information extracted from the content includes three pieces of information, each respectively pertaining to a person, a place, and an event.

Next, the product expression model designator 14 selects a product expression model that is suitable for the target content, from among product expression models stored in the product expression model accumulator 3 (S42). The product expression model designator 14 selects a product expression model of mainly performing compositing processing to add additional information to the content, layout processing to arrange a plurality of content pieces or a piece of divided content into particular positions, and transition effect processing of a chronological transition. The aforementioned processing includes corrections that are modified according to the specified attribute information of the content. As for the subsequent operations (S3 through S5 or S13 through S15), explanations are omitted as these steps are identical to Embodiments 1 and 2.

The following describes the compositing processing, layout processing, and transition effect processing applied to the specific attribute information respectively pertaining to a person, a place, and an event.

Figure 20C:
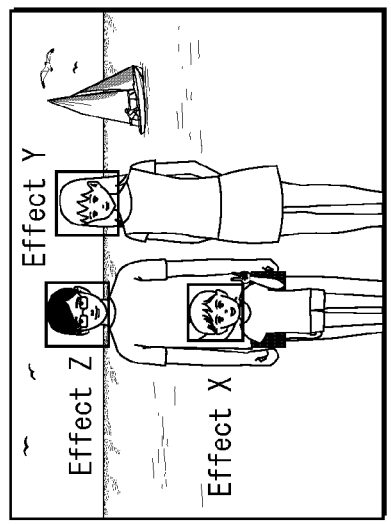
FIGS. 20A, 20B, and 20C each illustrate results of processing performed using corrections made according to information about a person, pertaining to Embodiment 3.
Figure 20B:
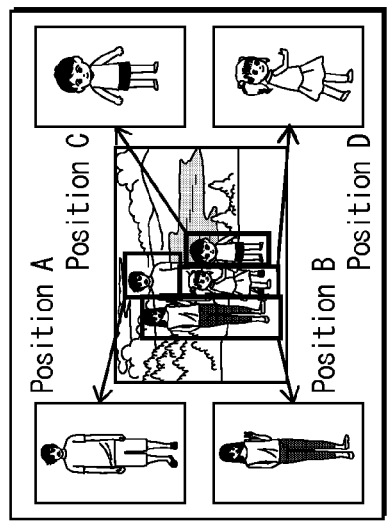
Figure 20A:
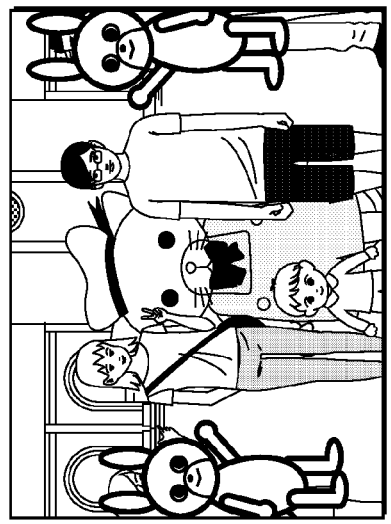

First, a case is described in which the specific attribute information for the content pertains to a person. Here, the attribute information pertaining to the person includes detectable elements such as a face, an upper body, and a full body. Adjustable items for each detected element include number, orientation, rotation, detection likelihood (reliability), age, gender, expression, clothing, or any combination of these items. Adjusting the corrections by calculating difference information for the adjustable items using the attribute information pertaining to the person enables the final processing to be performed. Specifically, the product expression model designator 14 determines the product expression model for the content, using the attribute value corresponding to the attribute information. The processing information determiner 6 determines the final corrections to the processing information and the additional processing information using the reference information for the product expression model and the attribute information for the content. FIGS. 20A, 20B, and 20C illustrate example results of the processing.

FIG. 20A depicts a product expression model in which photobombers, i.e., anyone other than the people facing forward, are composited with different cartoon characters. In such a case, the product expression model designator 14 takes the number, orientation, rotation, and size of the photobombers as adjustable items, determines a product expression model suited to each of the photobombers from among a plurality of product expression models for compositing cartoon characters, and accordingly determines a cartoon character suited to each photobomber. The processing information determiner 6 performs corrections to the product expression model in accordance with the reference information and the attribute information for each photobomber, such that the photobomber and cartoon character match in orientation. The processing executor 7 then executes the additional processing.

Next, FIG. 20B illustrates processing of determining an alternate layout by combining persons facing forward at the centre of a piece of content. In such a case, the product expression model designator 14 takes the number, orientation, rotation, and size of the persons facing forward as the adjustable items, then determines a product expression model among the product expression models suitable for a number of four, such that images each showing a subset including a person matching a person facing forward are respectively arranged in a layout for the content. The processing information determiner 6 determines processing for extracting the area in which the person appears from the images each showing a subset including the person matching the person matching forward, based on the reference information and the attribute information. The processing executor 7 then executes this processing.

Also, FIG. 20C illustrates processing determined by selecting a transition effect corrected to match the state of each forward-facing face in the content. Here, the transition effect is, for example, a switching effect executed upon a page-turning operation on a page of a digital album, involving zooming in on an aforementioned forward-facing face and clipping out while the image is changed. In such a case, the product expression model designator 14 takes the number, orientation, rotation, gender, and age of a forward-facing face as adjustable items, and determines a product expression model using a transition effect according to these items for each face. The processing information determiner 6 determines the processing for the content serving as the subsequent image for each detected face in the digital album. The processing executor 7 then executes the processing by successively displaying each effect.

Figure 21A:
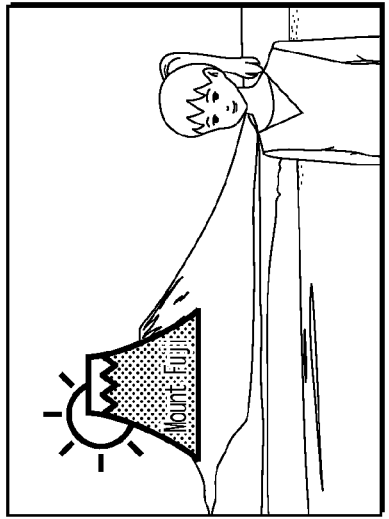
FIGS. 21A, 21B, and 21C each illustrate results of processing performed using corrections made according to information about a place, pertaining to Embodiment 3.
Figure 21B:
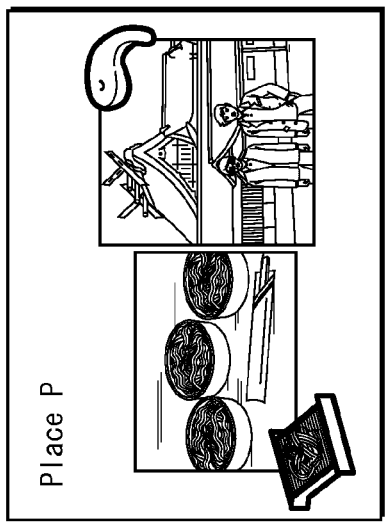
Figure 21C:

Next, a case is described in which the specific attribute information for the content pertains to a place. Here, the attribute information pertaining to the place is detectable information and includes GPS-based location information as well as landmarks. The adjustable items are the photographic angle, range, landmark size and number, provenance (past), or any combination of the above. Also, a photography timestamp, a time slot calculated from the photography timestamp, or a season may also be combined with each of the adjustable items. Adjusting the corrections by calculating difference information for the adjustable items using the attribute information pertaining to the place enables the final processing to be performed. FIGS. 21A, 21B, and 21C illustrate example results of the processing.

FIG. 21A shows a product expression model for compositing an illustration corresponding to a landmark to match a landmark in the background of the content. In this case, the product expression model designator 14 takes the photographic angle of the landmark, as well as the range, size, and photography time slot as reference information and selects a product expression model for adding the illustration to match the landmark. The processing information determiner 6 determines the additional processing information, and the processing executor 7 executes the processing. Specifically, the following process is performed. First, the content information extractor 12 uses the GPS latitude and longitude along with the photographic angle to specify the landmark as Mount Fuji. Next, the product expression model designator 14 selects a product expression model among product expression models corresponding to the Mount Fuji landmark for adding a decorative image of sunrise at Mount Fuji using the GPS photography timestamp information. Lastly, the processing information determiner 6 determines the size and position of the decorative image from the reference information of the product expression model and the attribute information, and the processing executor 7 executes the processing.

FIG. 21B illustrates processing of determining a layout for content originating in a place matching the location at which the content was photographed. In such a case, the content information extractor 12 takes an area size, photographic angle, and provenance relationship of the place photographed in the content as the adjustable items, then selects and extracts content most relevant to each place. The product expression model designator 14 selects a product expression model for arranging the content most relevant to the place in a layout. Specifically, the following process is performed. First, the content information extractor 12 specifies Izumo as the origin for content having a common provenance. Next, the content information extractor 12 detects Izumo soba noodles in the left-hand image and Izumo-taisha Shrine from the right-hand image, using photographic object analysis. The product expression model designator 14 selects, among all product expression models corresponding to the Izumo provenance, a product expression model for adding a decorative image of Izumo soba noodles to the left-hand image and a product expression model for adding a decorative image of a magatama ornament to the right-hand image. Lastly, the processing information determiner 6 determines the size and position of the decorative images from the reference information of the product expression model and the attribute information, and the processing executor 7 executes the processing.

Also, FIG. 21C illustrates processing determined by selecting a transition effect corrected to match the facilities at the location photographed in the content. Here, the situation at the location photographed in the content, the photographic angle, the range, and the time are used as adjustable items, a transition effect is determined that corresponds to the information for each facility, and processing is executed to sequentially display each effect. The content information extractor 12 analyses the situation in the image as portraying people at a wedding reception, and the product expression model designator 14 selects a product expression model of adding an effect K of swirling petals. Finally, the processing information determiner 6 uses the reference information of the product expression model and the attribute information to adjust the position at which the effect K occurs so as to prevent covering the faces of the photographic objects, and the processing executor 7 executes the processing.

Figure 22A:
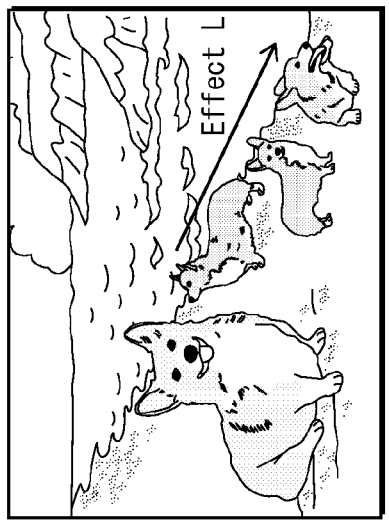
FIGS. 22A, 22B, and 22C each illustrate results of processing performed using corrections made according to information about an event, pertaining to Embodiment 3.
Figure 22B:
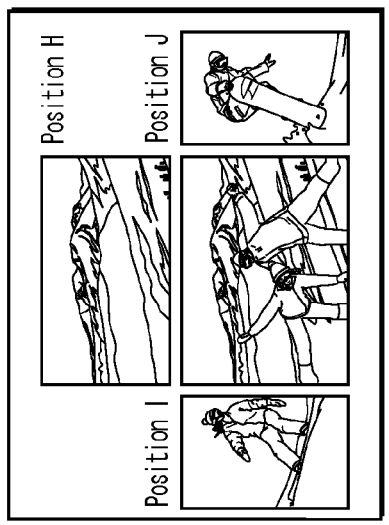
Figure 22C:
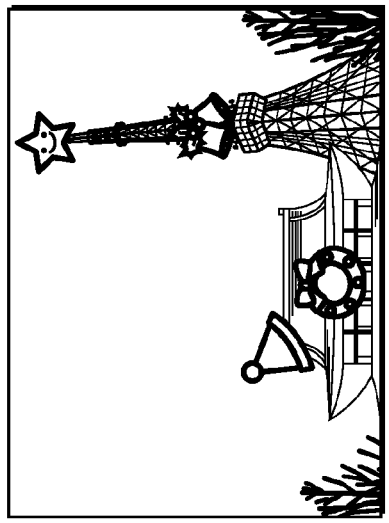

Next, a case is described in which the specific attribute information for the content pertains to an event. Here, the attribute information pertaining to the event is a seasonal event, an event photographic object, an event situation or the like, detectable in connection with the event photographed. The adjustable items include text information, photographic object number, photographic object size, background and scenario area, time span, and any combination of the above. Adjusting the corrections by calculating difference information for the adjustable items using the attribute information pertaining to the event enables the final processing to be performed. FIGS. 22A, 22B, and 22C illustrate example results of the processing.

FIG. 22A indicates processing for compositing an illustration pertaining to an event in correspondence with state information for a photographic object appearing in the content. In such a case, the size, region, shape, and photography time slot of the photographic object are used as adjustable items, and the processing is for selecting and processing an illustration of an event matching the photographic object. The content information extractor 12 extracts an event of Christmas from the photography time stamp. The product expression model designator 14 selects a product expression model for compositing illustrations related to Christmas with a building appearing as a photographic object. Finally, the processing information determiner 6 uses the reference information of the product expression model and the attribute information to determine compositing processing for compositing a decorative image of a star onto the top of a tower, for compositing a decorative image of a wreath onto a rooftop, and similar. The processing executor 7 then executes the compositing processing.

Next, FIG. 22B illustrates processing of determining an alternate content layout to match the composition of the centre of a piece of content. In such a case, the photographic object number, photographic object size, and scenery region are used as the adjustable items for the content. The photographic object region and background region making up the composition of the photographed content are extracted, content expressed most similarly to each photographic object region and background region is selected, and the layout processing is performed. Specifically, the product expression model designator 14 uses "Photographic Object Number: 4" obtained by the content information extractor 12 from the centre of the content, as a base for selecting one product expression model for arranging images in which the content is centred and images in which the photographic objects appear individually or in small groups are disposed at four locations around the content, and for selecting the four locations where the images are disposed. Next, the processing information determiner 6 performs adjustments such as extracting an image region using the attribute information and the reference information, or modifying and moving the layout frames. The processing executor 7 then executes the processing.

FIG. 22C indicates processing for selecting and determining a transition effect corrected to suit a number of photographic objects photographed in the event. Here, the number, size, frequency, and time period of a specific photographic object in the event are used as the adjustable items. A transition effect is determined according to the information for each photographic object, and processing is performed to sequentially display each effect. For the example of FIG. 22C, the content information extractor 12 extracts an object of a dog, which is the photographic object appearing in the photograph, for a group of content in which the dog is being walked in a situation with little change in background. The product expression model designator 14 selects a product expression model for chronologically applying a morphing transition effect L to the portion showing the photographic object. The processing information determiner 6 then adjusts the size of the extracted object, the transition effect L, the display sequence, and so on. The processing executor 7 executes the processing.

(Supplement)

(1) Corrections Based on Person Information

Embodiment 3, above, describes using the number, orientation, rotation, and size of a photobomber as adjustable items, and describes the product expression model designator 14 designating a product expression model appropriate for each photobomber from among a plurality of product expression models for compositing a cartoon character. However, the product expression model may also be as follows.

For example, a product expression model for arranging a cartoon character to be oriented toward a person detected as the photographic object may be used. Also, a product expression model for arranging a circle of onomatopoeic words to match the number of persons, a product expression model for adding noise audio to match the number of persons, or a product expression model for adding various stamps to match the age, gender, expression, and so on of persons appearing in the content may also be used.

Embodiment 3, above, describes using the number of persons facing forward, as well as the orientation, rotation, and size as adjustable items, and describes the product expression model designator 14 as determining a product expression such that images each showing a subset including a person matching the persons facing forward are respectively arranged in a layout for the content. However, the product expression model designator 14 may also use another product expression model, such as the following.

For example, a product expression model may also be used for targeting only faces within a fixed angle range among faces within the content, dividing the screen according to the number of targeted faces, and disposing related images. Alternatively, a product expression model may be used for weighting a surface area of a region in which objects appear, dividing the screen according to the weighting, and disposing related images. Also, a product expression model may be used for modifying decorative elements corresponding to images arranged around the content according to relational positions of persons in an image.

Embodiment 3, above, describes using the number of forward-facing faces, as well as the orientation, rotation, gender, and age as adjustable items, and describes the product expression model designator 14 as determining a transition effect according to such information for each face. However, the product expression model designator 14 may also use another product expression model, such as the following.

The product expression model designator 14 may, for example, use a product expression model for displaying a morphing transition effect in descending age order of the detected faces. Alternatively, a product expression model of displaying a transition to another image for each of a pair of detected faces may be used, or a product expression model of performing a camera transition focused only on a region in which detected persons appear may be used.

No limitation to the above examples is intended. Any process of determining corrections to a product expression model using attribute information pertaining to a person may be used.

Given the possibility of the analytical method being misrecognised by image recognition technology or the like, the analysis results may be calibrated. In such a case, for example, the content information extractor 12 may employ usage metadata such as SNS sharing information or manually-added tag information, and the user may simply input calibration information through a user interface provided for the content processing device 20.

Also, the content processing device 20 may establish priority according to an appearance frequency of persons in the content. For example, the content processing device 20 may prioritise information of a frequently-appearing person, detect such a person as the photographic object, and when uncertain as to whether a person is a photobomber, may treat the person as a photographic object.

(2) Corrections Based on Place Information

Embodiment 3 describes using the area size, photographic angle, and provenance relationship of the place photographed in the content as the adjustable items. The content information extractor 12 then selects and extracts content most relevant to the place photographed, and the product expression model designator 14 selects a product expression model for arranging the position of each piece of content into a layout. However, no limitation is intended. A product expression model such as the following may also be used.

For example, a product expression model may be used for changing the position of screen divisions taken between pieces of content, according to the proximity as per geographic information for a group of content photographed at a given place. Also, the additional processing information may be for arranging decorative images pertaining to a location photographed in the content, or for using a base or background pertaining to the location photographed in the content. Alternatively, when a group of content pertains to a plurality of landmarks, the decorative elements added to the content showing each landmark may be changed according to the number of photographs depicting each landmark. Also, processing may be used for arranging content pertaining to a landmark photographed many times such that important content is disposed in a central or enlarged frame.

Further, when a piece of content pertains to two or more landmarks, any one of the landmarks may be prioritized. Here, the priority order is determined, for example, according to the landmark type. Also, when a landmark is only partially detected, processing may be performed for adding a full image of the landmark so as to match the location and size of the detected landmark. In addition, additional processing may be used for adding decorative elements pertaining to a landmark to a large area of the content in which no photographic objects are detected, so as to match the size of the empty area. The additional processing for adding decorative elements and the like may be modified in terms of colour or the like to suit the photography time slot of the content.

Embodiment 3, above, describes a case where the product expression model designator 14 selects a product expression model for adding an effect K of swirling petals to an image analysed by the content information extractor 12 as depicting a situation where people are attending a wedding reception. However, no limitation is intended. A product expression model such as the following may also be used.

For example, the content information extractor 12 may determine a photograph purpose using not only the scenario at the place photographed but also building information. The product expression model designator 14 may then select a product expression model pertaining to the photograph purpose. Also, a transition effect for the content may be selected according to the position and motion of a photographic object over a map, or to match the movement of a specific photographic object through a content group.

No limitation to the above examples is intended. Any process of determining corrections to a product expression model using attribute information pertaining to a place may be used.

The method of obtaining place information is not limited to using GPS information. The content information extractor 12 may also use check-in information shared on an SNS, manually-added tag information, or simply use user feedback input through the user interface.

(3) Corrections Based on Event Information

Embodiment 3, above, describes using the size, region, shape, and photography time slot of a photographic object as the adjustable items, describes the product expression model designator 14 as selecting an event illustration to suit the photographic object, and describes the content processing device 20 as performing additional processing. However, no limitation is intended. A product expression model such as the following may also be used.

For example, the product expression model designator 14 may use a product expression model for compositing a layout of illustrations suiting the type, number, shape, and so on of items detected as photographic objects in the content. Further, a product expression model may be used for compositing a layout of items pertaining to detected text suiting a text area of the content. Also, a product expression model may be used for selecting and determining an illustration to add that suits the photograph purpose and time of the content.

When a plurality of events are found to pertain to the size, shape, or photography time slot of the photographic object, the content processing device 20 may determine which product expression model pertaining to the event will be used according to the type or scale of the event. Alternatively, the product expression model to be used may be determined according to the reliability of the analytical method detecting the event.

Embodiment 3, above, describes using the photographic object number, photographic object size, and scenery region as adjustable items, describes the content information extractor 12 as extracting the photographic object region and background region making up each piece of content, and describes the product expression model designator 14 as selecting a product expression model for selecting and arranging content most closely depicting each photographic object area or background area. However, another product expression model may be used, such as the following.

For instance, the product expression model designator 14 may use a product expression model for dividing a screen according to a common background scene or photographic object in content associated with an event. Also, a product expression model may be used for dividing a display area to match background transition information and selecting a split-screen layout to suit each event.

Embodiment 3, above, describes using the number, size, frequency, and time period of a specific photographic object in the event as adjustable items, describes the product expression model designator 14 as determining a transition effect for display according to the information for each photographic object, and describes the content processing device 20 as performing processing to modify the display order of the effects. However, another product expression model may also be used, such as the following.

For instance, when a plurality of specific objects are recognizable as photographic objects in an event, the product expression model designator 14 may select a product expression model for adding a transition effect that takes into account the number of objects during transition. Alternatively, a product expression model may be selected for centring the photographic object and adding a transition effect that takes the background motion into account.

No limitation to the above examples is intended. Any process of determining corrections to a product expression model using attribute information pertaining to an event may be used.

The method of obtaining event information is not limited to analysing the photographic object and the like. Check-in information shared on an SNS, album title information, manually-added tag information, or simply user feedback input through the user interface may also be used.

(Conclusion)

As described above, determining the product expression model according to the specific attribute information of content and correcting the product expression model according to the attribute information of the content enables an appropriate product expression model to be generated for application the content. Using a corrected product expression model enables the user to process the content into an effective viewable format for enjoyable viewing, without having to start from scratch.

[Embodiment 4]

The present Embodiment describes the details of a method for performing corrections to content so as to match a terminal condition for viewing a product. Components having the same functions as those of Embodiments 1 through 3 use the same reference numbers thereas, and explanations are omitted below.

Figure 23:
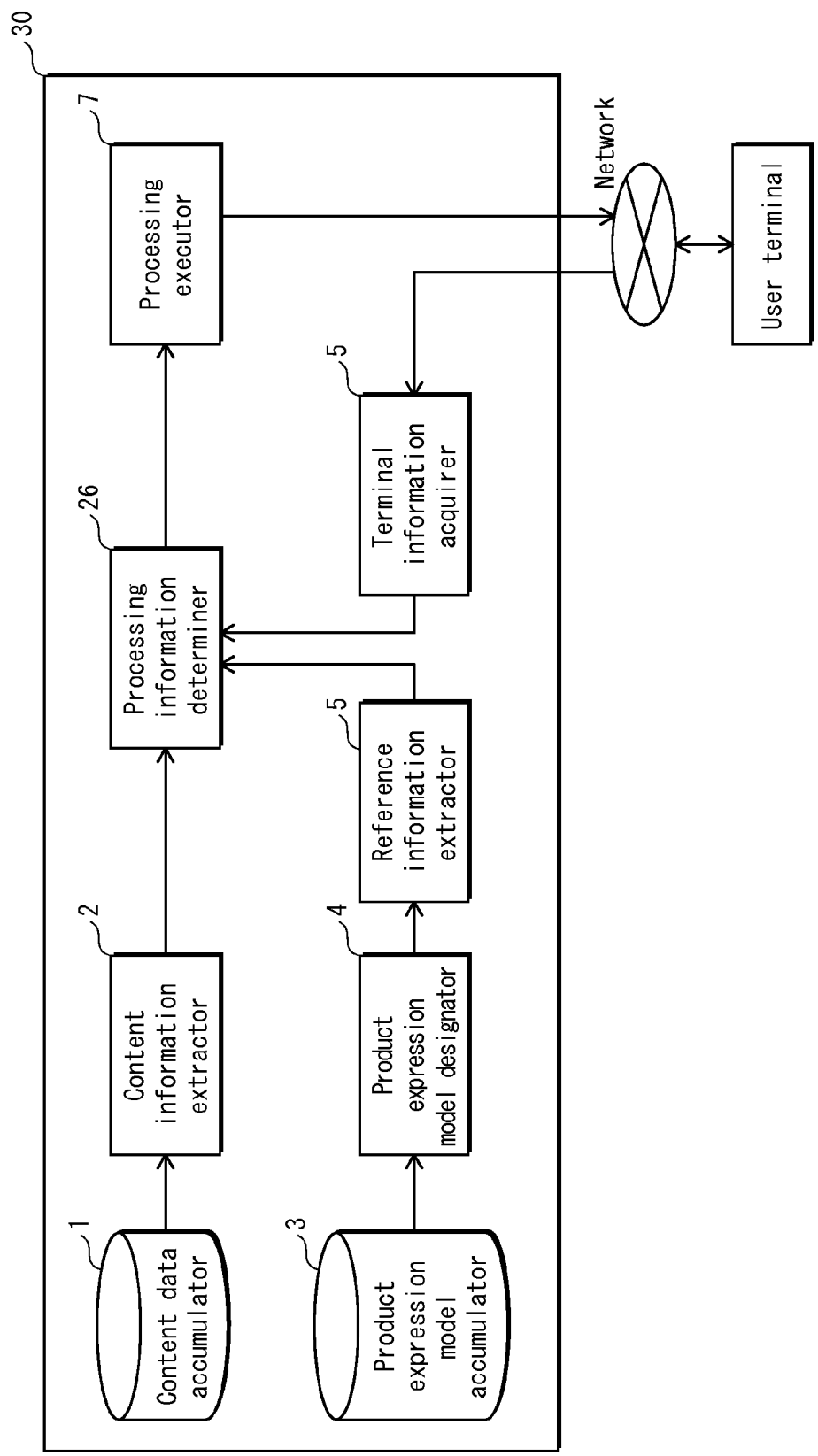
FIG. 23 is a block diagram indicating the configuration of a content processing device pertaining to Embodiment 4.

A content processing device 30 pertaining to the present Embodiment is shown in FIG. 23. A user terminal is a network terminal used by the user for viewing a product, such as a large liquid-crystal television, a personal computer, a tablet terminal, or the like.

A terminal information input unit 21 acquires terminal information from the user terminal intended for product viewing. Here, the terminal information indicates, for instance, terminal capabilities such as the size and resolution of the terminal screen, or a line speed for acquiring a product over a line such as Fiber to the Home (hereinafter, FTTH) or Long Term Evolution (hereinafter LTE).

A processing information determiner 26 determines corrections to the product expression model using the terminal information acquired by the terminal information input unit 21 in addition to the attribute information and the reference information. The details are described later.

(Operations)

The operations of the content processing device 30 pertaining to the present invention are described below. The content processing device 30 acquires the target content from the content data accumulator 1, and the content information extractor 2 extracts the attribute information from the acquired target content (S1 or S11).

Next, the content processing device 30 designates the product expression model used by the product expression model designator 4 from among product expression models accumulated by the product expression model accumulator 3 (S2 or S12).

The content processing device 30 then activates the reference information extractor 5. The reference information extractor 5 extracts reference information from the designated product expression model (S3 or S13).

Subsequently, the content processing device 30 activates the terminal information input unit 21. The terminal information input unit 21 acquires the terminal screen size and line type from the user terminal (S51).

The content processing device 30 then activates a processing information determiner 26. The processing information determiner 26 determines the correction for the product expression model based on the terminal information obtained by the terminal information input unit 21 in addition to the attribute information for the target content extracted by the content information extractor 2 and the reference information extracted by the reference information extractor 5 (S54). Given that the corrections to the product expression model using the reference information and the attribute information are similar to those described in step S4 of Embodiment 1 and step S14 of Embodiment 2, the following describes only the details of the corrections to the product expression model made using the terminal information.

The processing information determiner 26 determines the correction method for the product expression model and the processing information using the terminal information. In the present Embodiment, the product expression model is corrected to suit the terminal screen size and the line speed. For example, when the terminal screen size is ten inches or less, the product expression model is corrected for a product that is simple and easy to understand. Specifically, when the user terminal is a tablet with a five inch display, the processing information determiner 26 performs a correction of replacing a decorative image used in the additional processing with a simple pattern intended for tablet use. As another example, when the line speed of the user terminal for acquiring the product is 1 Mbps or less for a wired connection or 10 Mbps or less for a wireless connection, the correction to the product expression model is for reducing the data size of the product. Specifically, when the wire speed used by the user terminal for acquiring the product is 7.2 Mbps in a 3G mobile communication system, the processing information determiner 26 modifies the processing information so as to replace the processing of applying a morphing effect of a first image morphing into a second image with processing of switching from displaying the first image to displaying the second image.

Next, the content processing device 30 initiates the processing executor 7. The processing executor 7 performs content processing according to the processing information and the corrected product expression model, and stores the resulting content processing (S5 or S15).

(Supplement)
(1) Terminal Information

In Embodiment 4, above, an example of the terminal information is given as indicating terminal screen size and line type. However, other terminal information may also be used, such as the following.

For instance, the total number of pixels in the terminal screen or a combination of horizontal pixel number and vertical pixel number may be used as the terminal information. Also, when the content is video data, the maximum frame rate of the terminal screen may be used as the terminal information.

Further, the average or the maximum data transfer speed between the content processing device and the user terminal may be used as the terminal information.

(2) Product Expression Model Correction

Embodiment 4, above, describes correcting a product expression model so as to reduce the data size of the product when the line speed for the user terminal obtaining the product is equal to or less than a predetermined reference value, and so as to make the product simple and easy to understand when the terminal screen size is equal to or less than a predetermined reference value. However, the product expression model may also be corrected as follows.

For instance, the terminal screen size or the horizontal and vertical pixel numbers may be used as reference values, establishing "Screen size: Large" for a large television receiver or a personal computer having a large display, "Screen size: Medium" for a small television receiver or a notebook computer, and "Screen size: Small" for a tablet terminal, smartphone, or mobile phone. Then, the product expression model may be corrected to replace the decorative images with high-resolution images, thus avoiding the display quality degradation associated with processing for size reduction and compression when the screen size is large. Also, when the screen size is small, the product expression model may be corrected to replace a decorative image used in the additional processing with a simple pattern intended for tablet use, and also to delete a decorative image for which the reduction ratio exceeds a predetermined value (e.g., 20%). Alternatively, background image deletion or design frame deletion may be used as correction candidates for the product expression model. Generating the product in a quality suited to the size of the terminal screen enables the product to be viewed on a large screen in high quality, while also enabling the product to be viewed on a small screen in simplified form.

As another example, the line speed may similarly be used as a reference value, establishing "Line speed: High" for a high-speed wired connection such as FTTH at 100 Mbps or greater, establishing "Line speed: Medium" for a mid-range wired connection such as CATV or an asymmetric digital subscriber line (hereinafter, ADSL) and for a high-speed wireless connection such as LTE or WiMax, and "Line speed: Low" for a low-speed wired connection such as Integrated Services Digital Network (hereinafter, ISDN) or dial-up and for a mid-to-low range wireless connection such as 3G or PHS. Then, modifications reducing image quality, such as shrinking and compression, and reducing the framerate, may be avoided when the line speed is high. Also, processing information of processing video content as a static image may be replaced with processing information of processing video content as-is. Further, when the line speed is low, the processing information need not be limited to replacing a morphing effect. The processing information of applying a transition effect may be replaced with processing information of switching between images. Alternatively, the additional processing information for an animation effect may be corrected into additional processing information applied to a still image. Also, the processing information for processing video content as-is may be replaced with processing information for processing video content as a still image. This enables the product to be viewed in high-quality when in an environment using a high-speed line, while also enabling the product to be viewed easily in an environment where only low-speed lines are available, by reducing or eliminating the time required for data transfer.

For terminal information reading "Screen size: Medium" or "Line speed: Medium", the product expression model may, of course, be corrected to suit the mid-range screen size or line speed. That is, the processing information may be modified or the correction candidates for the processing information may be restricted. Alternatively, the additional processing information may be modified, or restrictions may be placed on the correction candidates for the additional processing information.

[Embodiment 5]

The present Embodiment describes the details of a method for processing content to suit a user instruction, or for recreating a product according to the user instruction. Components having the same functions as those of Embodiments 1 through 3 use the same reference numbers thereas, and explanations are omitted below.

Figure 24:
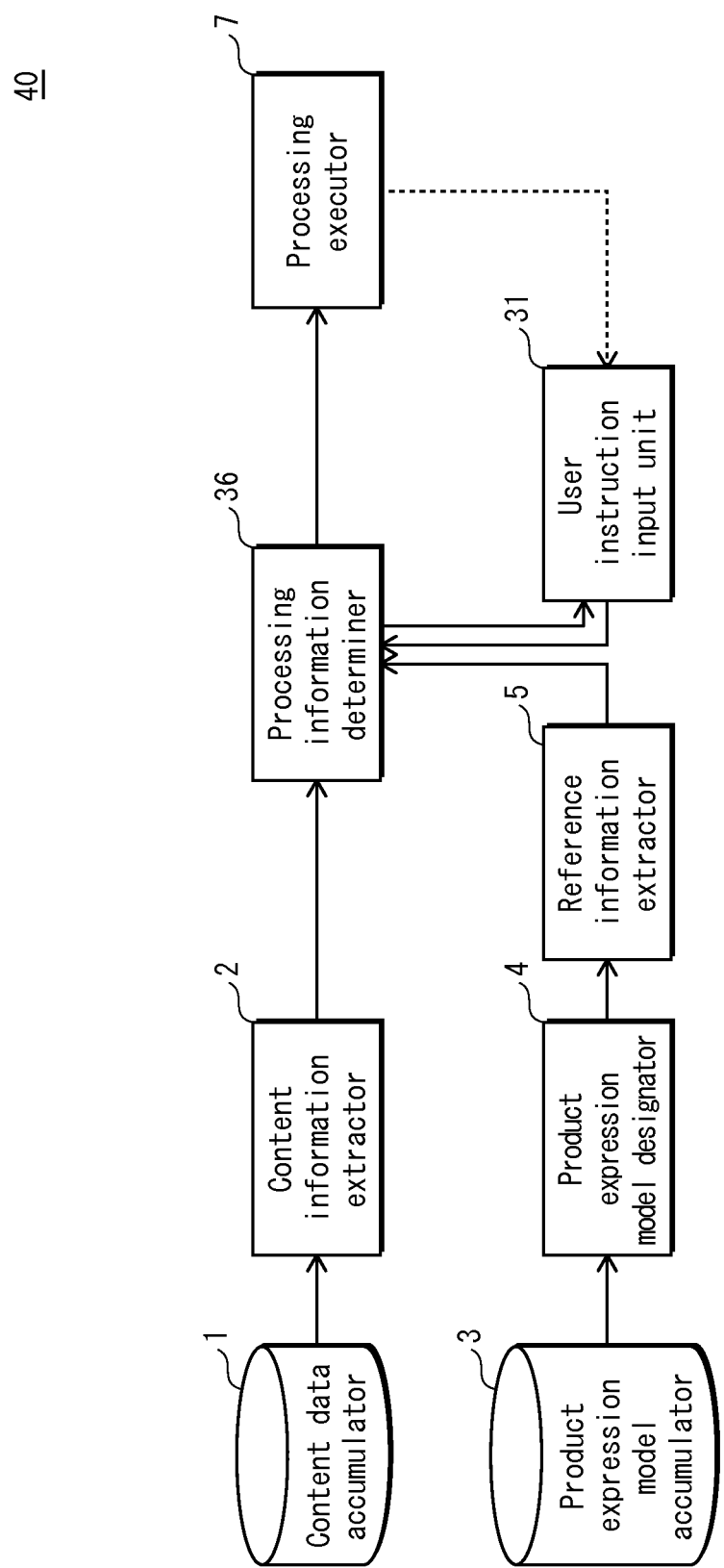
FIG. 24 is a block diagram indicating the configuration of a content processing device pertaining to Embodiment 5.

A content processing device 40 pertaining to the present Embodiment is shown in FIG. 24.

A user instruction input unit 31 obtains a user instruction concerning the product. The instruction concerning the product is, for example, an instruction to perform or not perform a correction to the product expression model so as to partially modify the attribute information or the reference information. The details are described later. The user instruction input unit 31 includes, for example, a display and a touch panel or the like, receiving the user instruction.

The processing information determiner 36 determines corrections to the product expression model using the user instruction received by the user instruction input unit 31 in addition to the attribute information and the reference information. The details are described later.

(Operations)

The operations of the content processing device 40 pertaining to the present invention are described below. The content processing device 40 acquires the target content from the content data accumulator 1, and the content information extractor 2 extracts the attribute information from the acquired target content (S1 or S11).

Next, the content processing device 40 designates the product expression model used by the product expression model designator 4 from among product expression models accumulated by the product expression model accumulator 3 (S2 or S12).

The content processing device 40 then activates the reference information extractor 5. The reference information extractor 5 extracts reference information from the designated product expression model (S3 or S13).

Next, the content processing device 40 activates the user instruction input unit 31 and the processing information determiner 36. The user instruction input unit 31 acquires the user instruction from the user (S61). Here, the user instruction input unit 31 acquires the attribute information and the reference information from the processing information determiner 36, and receives a user instruction designating one of "Keep attribute value", "Keep referent value", and "Use both values in correction" for each adjustable item defined in the reference information. For example, given an adjustable item reading "Number of Faces", an attribute value of three, and a referent value of one, the user instruction input unit 31 has the user select among: correcting the product expression model to read "Number of Faces: 3" such that the attribute information of the content is not changed, preventing the "Number of Faces: 1" information in the product expression model from being changed, and using a priority as described in Embodiment 1 to determine the number of faces.

The processing information determiner 36 then determines the correction method for the product expression model based on the user instruction obtained by the user instruction input unit 31, in addition to the attribute information for the target content extracted by the content information extractor 2 and the reference information extracted by the reference information extractor 5 (S64).

When the user instruction reads "Use both values in correction" for a given adjustable item, the processing information determiner 36 determines the correction pertaining to the adjustable item using the priority described in the supplement to Embodiment 1. Specifically, the processing is the same as step S4 or S14. Conversely, when the user instruction reads "Keep attribute value" or "Keep referent value", the correction pertaining to the adjustable item is determined using the priority so that only correction candidates appropriate to the user instruction are used. For example, given an adjustable item reading "Number of Faces", an attribute value of three, and a referent value of one, then when the user instruction reads "Keep attribute value", only correction candidates for which the product expression model keeps the number of faces of three are created, such that a corrected product expression model is determined with the priority, from among the created correction candidates.

Next, the content processing device 40 initiates the processing executor 7. The processing executor 7 performs content processing according to the processing information and the additional processing, and stores the resulting content processing (S5 or S15).

This enables the user to make selections for each adjustable item, preserving the balance between content characteristics and the creative intent of each product expression model. For example, this enables the creation of a product reflecting the user's preferences, such as not wanting to apply a decorative image to a particular landmark shown in photographic content, or wanting to avoid breaking the layout of a selected product expression model.

(Supplement)

(1) Reprocessing the User Instruction

Embodiment 5, above, describes a case where the user instruction is input before the content processing is executed. However, the content processing device 40 may present the product to the user after generation, and re-execute steps S64, S5, or S15 upon receiving the user instruction, then correct the product expression model and adjust the product. This enables the user to check the product while also making changes to the product to suit personal preference.

Also, the user instruction is not limited to a selection of one of "Keep attribute value", "Keep referent value", and "Use both values in correction" for each adjustable item. The user instruction may be a selection of one of "Keep attribute value" and "Don't keep attribute value", or one of "Keep referent value" and "Don't keep referent value". Alternatively, the user instruction may be for replacing the content, in whole or in part, with other content. Also, the user instruction may be for replacing the content processing with other processing having a lower priority, or for replacing the decorative image of the additional processing with another decorative image. Further, the content processing device may present the correction candidates for the product expression model along with the priority thereof, and the user may designate a condition for applying correction candidates such as a priority threshold, or may directly select whether or not to apply the correction candidates.

When correcting the product with a correction to the product expression model made upon receiving a user instruction after the product is created, then step S5 or S15 may be performed so as to redo only the processing pertaining to the difference information. In processed content and in additional processing, portions of the product expression model that are not corrected remain unchanged before and after adjustments to the product. As such, these can be used as-is in the adjusted product. That is, the product may be generated by executing content processing and additional processing pertaining to corrected portions of the product expression model. For example, given a user instruction to replace a portion of the content, the content processing device need only perform processing on portions of the product expression model for replaced content processing, for replaced additional processing, and the like.

(2) User Instruction Input

Embodiment 5, above, describes a case where the user instruction input unit 31 receives a user instruction for each adjustable item defined by the reference information. However, no limitation is intended. When the user instruction is received after the content has been generated, the user instruction input unit 31 may display the created content and receive an adjustment instruction. Also, when the user instruction input unit 31 receives a user instruction for correcting the additional processing, such as by replacing the decorative image, a preview of the product created according to the corrected product expression model may be presented to the user. This enables the user to more directly perform adjustments to the product.

(Further Variations on the Embodiments)

(1) In Embodiments 1 through 5, a case is described where the content is accumulated in the content data accumulator 1. However, no such limitation is intended. For example, the content processing device pertaining to the disclosure may include a content data acquirer acquiring content from an external recording medium or server where the content is accumulated, rather than the content data accumulator 1.

Also, in Embodiments 1 through 5, a case is described where the product expression model or the template is accumulated in the product expression model accumulator 3. However, no such limitation is intended. For example, the content processing device pertaining to the disclosure may include a product expression model acquirer acquiring a product expression model or template from an external recording medium or server where the product expression model or template is accumulated, rather than the product expression model accumulator 3.

(2) Embodiments 1 through 5, above, each describe a case in which the correction priority calculator 63 determines priority according to the correction and the difference value. However, no particular limitation is intended. For instance, the correction priority calculator 63 may calculate a correction difficulty according to one of the correction and the difference value. Here, the processing information corrector 64 and the additional processing information corrector 65 may apply a correction having the lowest difficulty, or apply a correction having a difficulty that is equal to or lower than a threshold.

(3) The content processing device of each of Embodiments 1 through 5 may be realised as an LSI (Large Scale Integration), which is a typical integrated circuit. Each circuit may be a single chip, or a single chip may include all or a subset of the circuits. For example, the content information extractor may be integrated in the same circuit as other circuit components, or in a separate integrated circuit.

Although LSI is mentioned above, the name IC (Integrated Circuit), system LSI, super LSI, or ultra LSI may be applied according to the degree of integration.

Also, the integrated circuit method is not limited to LSI. A dedicated circuit or general-purpose processor may also be used. After LSI manufacture, a FPGA (Field Programmable Gate Array) or a reconfigurable processor may be used.

Further still, advances and discoveries in semiconductor technology may lead to a new technology replacing LSI. Functional blocks may, of course, be integrated using such future technology.

Also, the content processing device of each of Embodiments 1 through 5 may be realised as a program written onto a recording medium and executed by a computer reading the program. The recording medium may be a memory card, a CD-ROM, or any other recording medium. Further, the content processing device of each of Embodiments 1 through 5 may be realised as a program downloaded via a network and executed by a computer having downloaded the program. The program is a digital content processing program executed by a computer and causing the computer to perform a product generation process of generating a product by processing digital content using a product expression model that indicates how the product is to be expressed, the product generation process comprising: a content information acquisition step of acquiring attribute information from a piece of target content; a reference information acquisition step acquiring reference information pertaining to a product expression model and indicating an attribute sought in a piece of content matching the product expression model; a processing information determination step correcting the product expression model according to the reference information and the attribute information, and determining processing information for processing the piece of target content to match the product expression model thus corrected; and a processing execution step processing the piece of target content according to the processing information, and using the piece of target content thus processed and the product expression model thus corrected to generate the product.

(4) The descriptions of Embodiments 1 through 5, given above, are only examples. Various improvements thereto and variations thereon are also applicable, provided that these do not exceed the scope of the present disclosure.

(Supplement)

The configuration and effects of the content processing device, integrated circuit, method, and program pertaining to the Embodiments are described below.

(1) In one aspect, a digital content processing device generates a product by processing digital content using a product expression model that indicates how the product is to be expressed, the content processing device comprising: a content information acquirer acquiring attribute information from a piece of target content; a reference information acquirer acquiring reference information pertaining to a product expression model and indicating an attribute required in a piece of content matching the product expression model; a processing information determiner correcting the product expression model according to the reference information and the attribute information, and determining processing information for processing the piece of target content to match the product expression model thus corrected; and a processing executor processing the piece of target content according to the processing information, and using the piece of target content thus processed and the product expression model thus corrected to generate the product.

In another aspect, an integrated circuit generating a product by processing digital content using a product expression model that indicates how the product is to be expressed, the integrated circuit comprising: a content information acquirer acquiring attribute information from a piece of target content; a reference information acquirer acquiring reference information pertaining to a product expression model and indicating an attribute required in a piece of content matching the product expression model; a processing information determiner correcting the product expression model according to the reference information and the attribute information, and determining processing information for processing the piece of target content to match the product expression model thus corrected; and a processing executor processing the piece of target content according to the processing information, and using the piece of target content thus processed and the product expression model thus corrected to generate the product.

In a further aspect, a digital content processing method of generating a product by processing digital content using a product expression model that indicates how the product is to be expressed, the content processing method comprising: a content information acquisition step of acquiring attribute information from a piece of target content; a reference information acquisition step of acquiring reference information pertaining to a product expression model and indicating an attribute required in a piece of content matching the product expression model; a processing information determination step of correcting the product expression model according to the reference information and the attribute information, and determining processing information for processing the piece of target content to match the product expression model thus corrected; and a processing execution step of processing the piece of target content according to the processing information, and using the piece of target content thus processed and the product expression model thus corrected to generate the product.

In an additional aspect, a digital content processing program executed by a computer and causing the computer to perform a product generation process of generating a product by processing digital content using a product expression model that indicates how the product is to be expressed, the product generation process comprising: a content information acquisition step of acquiring attribute information from a piece of target content; a reference information acquisition step acquiring reference information pertaining to a product expression model and indicating an attribute required in a piece of content matching the product expression model; a processing information determination step correcting the product expression model according to the reference information and the attribute information, and determining processing information for processing the piece of target content to match the product expression model thus corrected; and a processing execution step processing the piece of target content according to the processing information, and using the piece of target content thus processed and the product expression model thus corrected to generate the product.

According to the above configuration, a user is able to correct a product expression model for various content according to the attribute information of the content. Thus, a product expression model suitable for the content is applied thereto. The content processing device need not always store processing information that is suitable for the content, but may instead use a corrected product expression model to enable the user to process the content into an effective viewable format for enjoyable viewing, without having to start processing from scratch.

(2) Also, in the digital content processing device of section (1), above, the product expression model includes a template, and the reference information pertains to the template and includes one or more adjustable items, each being adjustable through the correction by the processing information determiner.

Accordingly, an adjustable item among items that can be corrected according to the attribute information of the content within the product expression model is clarified. Also, the product expression model is treatable in template units. As such, the user is able to select a product expression model suitable for the content by selecting a template.

(3) Also, in the digital content processing device of section (2), above, the reference information includes a referent value for each of the adjustable items, the attribute information includes an attribute value acquired for each of the adjustable items, and the processing information determiner corrects the product expression model according to a difference, computed for each of the adjustable items, between the referent value and the attribute value, and then determines the processing information.

Accordingly, a difference between the attribute information of the content and the reference information of the template is quantitatively evaluated for each adjustable item of the template. This enables the template to be corrected more appropriately for the content.

(4) Also, in the digital content processing device of section (3), above, the adjustable items pertain to image information, and the content information acquirer acquires the attribute information by performing image analysis of the piece of target content.

Accordingly, content information pertaining to a face, a person, a situation, and similar image information is used with a template that is correctible for such image information, thus enabling product generation.

(5) Also, in the digital content processing device of section (3), above, the adjustable items pertain to audio information, and the content information acquirer acquires the attribute information by performing audio analysis of the piece of target content.

Accordingly, content information pertaining to audio, paralinguistic, environmental, designated source, and other audio information is used with a template that is correctible for such audio information, thus enabling product generation.

(6) Also, in the digital content processing device of section (3), above, the adjustable items pertain to a relationship between persons photographed in the piece of target content, and the content information acquirer acquires the attribute information by performing analysis of the relationship between the persons photographed in the piece of target content.

Accordingly, content information pertaining to parental relationships, friends, SNS information, online information, and other relationship information is used with a template that is correctible for such relationship information, thus enabling product generation.

(7) Also, in the digital content processing device of section (3), above, the processing information determiner creates a product expression model correction candidate, a processing information candidate, and a correction priority for each of the adjustable items, then corrects the product expression model and determines product processing information according to the correction priority.

Accordingly, a determination regarding whether or not to correct the adjustable items in the template is made according to the content, thus enabling the template to be corrected in a form more appropriate to the content.

(8) Also, in the digital content processing device of section (7), above, the processing information includes information for processing at least one of a photographic object region and a background region of the piece of target content.

Accordingly, region processing of dividing a region, combining regions, extracting or modifying a region, and so on is applicable to a photographic object region or to a background region, in order to match the content to the reference information of the corrected template.

(9) Also, in the digital content processing device of section (7), above, a correction to the product expression model pertains to a decorative element for the piece of target content, and is a process of modifying one or more elements of the template to suit the piece of target content.

Accordingly, modifications are applicable to a background portion, a decorative portion, a transition effect portion, a layout portion, or similar portions using decorations applied to the content within the template.

(10) Also, in the digital content processing device of section (9), above, the correction to the product expression model is a process of acquiring the elements of the template via a network, and replacing one or more of the elements of the template with the elements acquired via the network to suit the piece of target content.

Accordingly, portions to be modified among using decorations applied to the content are obtainable via a network.

(11) Also, in the digital content processing device of section (1), a terminal information receiver receives terminal information for viewing the product, wherein the processing information determiner uses the terminal information when correcting the product expression model and determining the processing information.

Accordingly, the content processing device is able to generate an appropriate product suitable to the terminal used to view the product.

(12) Also, in the digital content processing device of section (1), above, a user instruction receiver receives a user instruction pertaining to the product, wherein the processing information determiner uses the user instruction when correcting the product expression model and determining the processing information.

Accordingly, the content processing device is able to generate a product suited to the user's preferences by incorporating the user instruction.

(13) Also, in the digital content processing device of section (12), above, the user instruction concerns corrects the product expression model, and indicates whether or not to apply a correction pertaining to one of the attribute information and the reference information.

Accordingly, the user is able to explicitly instruct the content processing device to incorporate the reference information or the attribute information of the content as-is, or to necessarily process a given portion.

(14) Also, in the digital content processing device of section (1), above, the content information acquirer acquires, through analysis, specific attribute information pertaining to one or more of a photographic object, a photographic environment, or a photographic subject, and the content processing device further comprises a product expression model determiner using the specific attribute information to determine the product expression model.

Accordingly, determining the product expression model according to the specific attribute information of content and correcting the product expression model according to the attribute information of the content enables an appropriate product expression model to be generated for application to the content. Using a corrected product expression model enables the user to process the content into an effective viewable format for enjoyable viewing, without having to start from scratch.

(15) Also, in the digital content processing device of section (14), also, the content information acquirer acquires the specific attribute information by analysing the piece of target content, and includes at least one of a person analysis unit analysing face information or body information, a place analysis unit analysing GPS information or landmark information, and event analysis information analysing theme information or action information, and the specific attribute information is acquired by the analysis units in the content information acquirer, and includes at least one of photographic object information pertaining to a person, photographic environment information pertaining to a place, and photographic subject information pertaining to an event.

Accordingly, for content in which the photographic object is a person, and the specific attribute information is photographic object information such as face or body information, an item in the photographic object information such as the number, orientation, rotation, detection reliability, age, gender, expression, clothing, and so on, is usable for determining corrections to a product expression model applied to the content. Further, for content photographed in a common place or in related places, and for which the specific attribute information is place information such as GPS or landmark information, an item in the place information such as angle, region, size, time slot, season, location name, items of local provenance and so on, is usable for determining corrections to the product expression model applied to the content. Further still, for content photographed at a common event or in related events, and for which the specific attribute information is photograph information such as a theme, a situation, or an action, an item in the event information such as the time span, seasonal item, area of motion, event, celebration, and so on, is useable for determining corrections to the product expression model applied to the content.

(16) Also, in the digital content processing device of section (14), above, the processing information includes one or more of composite processing information for decorating the piece of target content, display processing information for displaying a transition effect on the piece of target content, and layout processing information for rearranging the piece of target content, and each of the composite processing information, the display processing information, and the layout processing information is determined by analysing the piece of target content.

Accordingly, when a product expression model is corrected for each piece of content by obtaining the specific attribute information for the content, then content compositing or a transition effect between pieces of the content is usable as the processing information for the content, and content layout is determinable as the correction method for the product expression model.

A content processing device and method of the present disclosure enable a user to performing dynamic corrections and modify processing according to the actual photographic objects and photographed subjects in the user's local data when, for example, the content is being decorated or when a digital album or slideshow is being generated. Accordingly, the content is effectively processed in an appropriate viewing form, and is thus applicable to various viewing terminals. Further applications to a DVD or BD recorder, a television, computer software, and a data server are also possible.

REFERENCE SIGNS LIST

10, 20, 30, 40 Content processing device
1 Content data accumulator
2, 12 Content information extractor
3 Product expression model accumulator
4, 14 Product expression model designator
5 Reference information extractor
6, 26, 36 Processing information determiner
7 Processing executor
21 Terminal information acquirer
31 User instruction input unit
61 Content information analyzer
62 Difference calculator
63 Correction priority calculator
64 Processing information corrector
65 Additional processing information corrector

The invention claimed is:

1. A digital content processing device generating a product by processing digital content using a product expression model that indicates how the product is to be expressed, the content processing device comprising one or more hardware processors configured to operate as:

a content information acquirer acquiring attribute information from a piece of target content;

a reference information acquirer acquiring reference information pertaining to a product expression model and indicating an attribute required in a piece of content matching the product expression model;

a processing information determiner, when the reference information and the attribute information differ from each other in terms of a plurality of attributes, correcting the product expression model directly using the reference information and the attribute information with respect to part of the plurality of attributes, and determining processing information for processing the piece of target content with respect to one or more of the plurality of attributes based on the corrected product expression model; and a processing executor processing the piece of target content according to the processing information, and using the piece of target content thus processed and the product expression model thus corrected to generate the product.

2. The digital content processing device of claim 1, wherein
the product expression model includes a template, and
the reference information pertains to the template and includes one or more adjustable items, each being adjustable through the correction by the processing information determiner.

3. The digital content processing device of claim 2, wherein
the reference information includes a referent value for each of the adjustable items,
the attribute information includes an attribute value acquired for each of the adjustable items, and
the processing information determiner corrects the product expression model according to a difference, computed for each of the adjustable items, between the referent value and the attribute value, and then determines the processing information.

4. The digital content processing device of claim 3, wherein
the adjustable items pertain to image information, and
the content information acquirer acquires the attribute information by performing image analysis of the piece of target content.

5. The digital content processing device of claim 3, wherein
the adjustable items pertain to audio information, and
the content information acquirer acquires the attribute information by performing audio analysis of the piece of target content.

6. The digital content processing device of claim 3, wherein
the adjustable items pertain to a relationship between persons photographed in the piece of target content, and
the content information acquirer acquires the attribute information by performing analysis of the relationship between the persons photographed in the piece of target content.

7. The digital content processing device of claim 3, wherein
the processing information determiner creates a product expression model correction candidate, a processing information candidate, and a correction priority for each of the adjustable items, then corrects the product expression model and determines product processing information according to the correction priority.

8. The digital content processing device of claim 7, wherein
the processing information includes information for processing at least one of a photographic object region and a background region of the piece of target content.

9. The digital content processing device of claim 7, wherein
a correction to the product expression model pertains to a decorative element for the piece of target content, and is a process of modifying one or more elements of the template to suit the piece of target content.

10. The digital content processing device of claim 9, wherein
the correction to the product expression model is a process of acquiring the elements of the template via a network, and replacing one or more of the elements of the template with the elements acquired via the network to suit the piece of target content.

11. The digital content processing device of claim 1, further comprising
a terminal information receiver receiving terminal information for viewing the product, wherein
the processing information determiner uses the terminal information when correcting the product expression model and determining the processing information.

12. The digital content processing device of claim 1, further comprising
a user instruction receiver receiving a user instruction pertaining to the product, wherein
the processing information determiner uses the user instruction when correcting the product expression model and determining the processing information.

13. The digital content processing device of claim 12, wherein
the user instruction concerns correcting the product expression model, and indicates whether or not to apply a correction pertaining to one of the attribute information and the reference information.

14. The digital content processing device of claim 1, wherein
the content information acquirer acquires, through analysis, specific attribute information pertaining to one or more of a photographic object, a photographic environment, or a photographic subject, and
the content processing device further comprises a product expression model determiner using the specific attribute information to determine the product expression model.

15. The digital content processing device of claim 14, wherein
the content information acquirer acquires the specific attribute information by analyzing the piece of target content, and includes at least one of a person analysis unit analyzing face information or body information, a place analysis unit analyzing GPS information or landmark information, and event analysis information analyzing theme information or action information, and
the specific attribute information is acquired by the analysis units in the content information acquirer, and includes at least one of photographic object information pertaining to a person, photographic environment information pertaining to a place, and photographic subject information pertaining to an event.

16. The digital content processing device of claim 14, wherein
the processing information includes one or more of composite processing information for decorating the piece of target content, display processing information for displaying a transition effect on the piece of target content, and layout processing information for rearranging the piece of target content, and each of the composite processing information, the display processing information, and the layout processing information is determined by analyzing the piece of target content.

17. An integrated circuit generating a product by processing digital content using a product expression model that indicates how the product is to be expressed, the integrated circuit comprising one or more hardware processors configured to operate as:

a content information acquirer acquiring attribute information from a piece of target content;

a reference information acquirer acquiring reference information pertaining to a product expression model and indicating an attribute required in a piece of content matching the product expression model;

a processing information determiner, when the reference information and the attribute information differ from each other in terms of a plurality of attributes, correcting the product expression model directly using the reference information and the attribute information with respect to part of the plurality of attributes, and determining processing information for processing the piece of target content with respect to one or more of the plurality of attributes based on the corrected the product expression model; and a processing executor processing the piece of target content according to the processing information, and using the piece of target content thus processed and the product expression model thus corrected to generate the product.

18. A digital content processing method of generating a product by processing digital content using a product expression model that indicates how the product is to be expressed, the content processing method comprising:

a content information acquisition step of acquiring attribute information from a piece of target content;

a reference information acquisition step of acquiring reference information pertaining to a product expression model and indicating an attribute required in a piece of content matching the product expression model;

a processing information determination step of, when the reference information and the attribute information differ from each other in terms of a plurality of attributes, correcting the product expression model directly using the reference information and the attribute information with respect to part of the plurality of attributes, and determining processing information for processing the piece of target content with respect to one or more of the plurality of attributes based on the corrected product expression model; and a processing execution step of processing the piece of target content according to the processing information, and using the piece of target content thus processed and the product expression model thus corrected to generate the product, wherein the method is performed using a computer or processor.

19. A non-transitory computer-readable digital content processing program executed by a computer and causing the computer to perform a product generation process of generating a product by processing digital content using a product expression model that indicates how the product is to be expressed, the product generation process comprising:

a content information acquisition step of acquiring attribute information from a piece of target content;

a reference information acquisition step acquiring reference information pertaining to a product expression model and indicating an attribute required in a piece of content matching the product expression model;

a processing information determination step of, when the reference information and the attribute information differ from each other in terms of a plurality of attributes, correcting the product expression model directly using the reference information and the attribute information with respect to part of the plurality of attributes, and determining processing information for processing the piece of target content with respect to one or more of the plurality of attributes based on the corrected product expression model; and a processing execution step processing the piece of target content according to the processing information, and using the piece of target content thus processed and the product expression model thus corrected to generate the product.

* * * * *